US011690087B2

(12) United States Patent
Xu et al.

(10) Patent No.: US 11,690,087 B2
(45) Date of Patent: Jun. 27, 2023

(54) CONTROL RESOURCE SET AND SEARCH SPACE SET CONFIGURATION FOR FULL DUPLEX OPERATION

(71) Applicant: QUALCOMM Incorporated, San Diego, CA (US)

(72) Inventors: Huilin Xu, San Diego, CA (US); Hung Dinh Ly, San Diego, CA (US); Peter Pui Lok Ang, San Diego, CA (US); Muhammad Sayed Khairy Abdelghaffar, San Jose, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/084,302

(22) Filed: Oct. 29, 2020

(65) Prior Publication Data

US 2021/0136771 A1 May 6, 2021

Related U.S. Application Data

(60) Provisional application No. 62/928,162, filed on Oct. 30, 2019.

(51) Int. Cl.
*H04W 72/04* (2023.01)
*H04L 5/14* (2006.01)
(Continued)

(52) U.S. Cl.
CPC ............. *H04W 72/53* (2023.01); *H04L 5/14* (2013.01); *H04W 72/0446* (2013.01); *H04W 72/0453* (2013.01); *H04W 72/23* (2023.01)

(58) Field of Classification Search
CPC ........... H04W 72/0493; H04W 72/042; H04W 72/0446; H04W 72/0453; H04L 5/14
See application file for complete search history.

(56) References Cited

U.S. PATENT DOCUMENTS 10,863,511 B2* 12/2020 Cheng ............... H04W 72/1257
2015/0333896 A1* 11/2015 Damnjanovic ......... H04L 5/143
370/277

(Continued)

FOREIGN PATENT DOCUMENTS

EP 3703295 A1 9/2020
WO WO-2019096297 A1 5/2019

OTHER PUBLICATIONS

Ericsson: "Modelling of PDCCH Monitoring Considering Duplex Modes", 3GPP Draft, 3GPP TSG-RAN WG2 #100, R2-1713466—Modelling of PDCCH Monitoring Considering Duplex Modes, 3rd Generation Partnership Project (3GPP), Mobile Competence Centre, 650, Route Des Lucioles, F-06921 Sophia-Antipoli, vol. Ran WG2, No. Reno. US, Nov. 27, 2017-Dec. 1, 2017 Nov. 17, 2017 (Nov. 17, 2017), XP051372174, pp. 1-4, Retrieved from the Internet: URL:http://www.3gpp.org/ftp/tsg%5Fran/WG2%5FRL2/TSGR2%5F100/Docs/ [retrieved on Nov. 17, 2017] the whole document.

(Continued)

*Primary Examiner* — Huy D Vu
*Assistant Examiner* — Bailor C Hsu
(74) *Attorney, Agent, or Firm* — Holland & Hart LLP/Qualcomm Incorporated

(57) ABSTRACT

Generally, the described techniques provide for duplex mode configuration for control information (e.g., duplex mode configuration for communication of downlink control information). For example, duplex modes may be defined (e.g., as full duplex (FD) capable, FD only, half duplex (HD) only, etc.), and such duplex modes may be configured for control resource sets (CORESETs), search space (SS) sets, or both. In some examples, duplex modes configured for a CORESET/SS set may depend on the priority of information conveyed via the CORESET/SS set. For example, a CORESET/SS set for high priority or critical control information may be configured with a HD mode to avoid FD self- (Continued)

interference, while CORESET/SS set for other control information may be configured with a FD mode to improve spectrum efficiency. Techniques for resolving conflicting duplex mode configurations (e.g., when a HD mode is configured for a SS set within a CORESET configured with FD) are also described.

30 Claims, 16 Drawing Sheets

(51) Int. Cl.
  *H04W 72/53* (2023.01)
  *H04W 72/0453* (2023.01)
  *H04W 72/0446* (2023.01)
  *H04W 72/23* (2023.01)

(56) References Cited

U.S. PATENT DOCUMENTS

| | | | | |
|---|---|---|---|---|
| 2019/0150124 A1* | 5/2019 | Nogami | ............... | H04L 5/0044 370/330 |
| 2019/0215870 A1* | 7/2019 | Babaei | .................... | H04L 5/001 |
| 2019/0342888 A1* | 11/2019 | Hosseini | ............ | H04W 72/1215 |
| 2020/0099476 A1* | 3/2020 | Park | ........................ | H04W 4/70 |
| 2020/0169377 A1* | 5/2020 | Lee | ................... | H04W 56/0015 |
| 2020/0229112 A1* | 7/2020 | John Wilson | ............. | H04L 5/14 |
| 2020/0314822 A1* | 10/2020 | Lee | ........................ | H04W 72/12 |
| 2020/0329389 A1* | 10/2020 | Hosseini | ............... | H04W 24/08 |

OTHER PUBLICATIONS

Ericsson: PDCCH Monitoring and Duplex Mode Operation, 3GPP Draft, 3GPP TSG-RAN WG2#103bis, R2-1814791—PDCCH Monitoring and Duplex Mode Operation, 3rd Generation Partnership Project (3GPP), Mobile Competence Centre, 650, Route Des Lucioles, F-06921 Sophia-Antipolis Cedex, FR, vol. RAN WG2, No. Chengdu, China, Oct. 8, 2018-Oct. 12, 2018 Sep. 28, 2018 (Sep. 28, 2018), XP051524175, pp. 1-5, Retrieved from the Internet: URL:http://www.3gpp.org/ftp/tsg%5Fran/WG2%5FRL2/TSGR2%5F103bis/Docs/R2%2DI814791%2Ezip, [retrieved on Sep. 28, 2018] the whole document.
International Search Report and Written Opinion—PCT/US2020/058130—ISA/EPO—dated Feb. 25, 2021 (195730WO).
Samsung: "DCI Design for Support of SL SPS", 3GPP Draft, 3GPP TSG RAN WG1 Meeting #88, R1-1702863_SAMSUNG_SPS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017 Feb. 12, 2017 (Feb. 12, 2017), XP051210008, 4 Pages, Retrieved from the Internet: URL:http://www.3gpp.org/ftp/Meetings_3GPP_SYNC/RAN1/Docs/, [retrieved on Feb. 12, 2017] the whole document.

* cited by examiner

CONTROL RESOURCE SET AND SEARCH SPACE SET CONFIGURATION FOR FULL DUPLEX OPERATION

CROSS REFERENCE

The present Application for Patent claims the benefit of U.S. Provisional Patent Application No. 62/928,162 by XU et al., entitled "CONTROL RESOURCE SET AND SEARCH SPACE SET CONFIGURATION FOR FULL DUPLEX OPERATION," filed Oct. 30, 2019, assigned to the assignee hereof, and expressly incorporated by reference herein.

BACKGROUND

The following relates generally to wireless communications, and more specifically to control resource set (CORESET) and search space (SS) set configuration for full duplex operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communication systems, devices may be capable of transmitting and receiving simultaneously. For example, a UE may be capable of both transmitting uplink traffic to a base station and receiving downlink traffic from a base station (e.g., a same or different base station, different antennas from a same or different base station, etc.) simultaneously. This capability of communicating in two directions (e.g., the capability of transmitting and receiving) at a same time and at a same frequency may be defined as a full duplex capability. However, in some cases, full duplex communications may result in self-interference at the full duplex device which may adversely impact the downlink and/or uplink communications.

SUMMARY

The described techniques relate to improved methods, systems, devices, and apparatuses that support control resource set (CORESET) and search space (SS) set configuration for full duplex operation. Generally, the described techniques provide for duplex mode configuration for control information (e.g., duplex mode configuration for communication of downlink control information). For example, duplex modes may be defined (e.g., as full duplex (FD) capable, FD only, half duplex (HD) only, etc.), and such duplex modes may be configured for CORESETs, SS sets, or both.

In some examples, duplex modes configured for a CORESET/SS set may depend on the priority of information conveyed via the CORESET/SS set. For example, CORESET/SS set for high priority or critical control information (e.g., CORESET #0 for initial access information) may be configured with a HD mode to avoid FD self-interference, while CORESET/SS set for other control information (e.g., CORESETs for downlink scheduling information) may be configured with a FD mode to improve spectrum efficiency. In some cases, duplex modes may be configured based on the configured aggregation level (AL). Further, techniques for resolving conflicting duplex mode configurations (such as when a HD mode is configured for a SS set within a CORESET configured with FD) are also described. In one example, a duplex mode for a SS set may override a configured duplex mode for a CORESET corresponding to the SS set. In another example, conflicting duplex modes may be resolved based on a comparison of the configured duplex modes (e.g., a HD configuration may override a FD configuration, a FD configuration may override a HD configuration, etc.).

A method of wireless communication at a UE is described. The method may include receiving an indication that a duplex mode is associated with a control resource set, a search space set, or both, and identifying a first search space set including one or more symbols of a first control resource set, where the indication pertains to at least one of the first search space set or the first control resource set. The method may further include receiving, in accordance with the duplex mode, downlink control information in the first control resource set according to the first search space set.

An apparatus for wireless communication at a UE is described. The apparatus may include a processor, memory coupled with the processor, and instructions stored in the memory. The instructions may be executable by the processor to cause the apparatus to receive an indication that a duplex mode is associated with a control resource set, a search space set, or both, identify a first search space set including one or more symbols of a first control resource set, where the indication pertains to at least one of the first search space set or the first control resource set, and receive, in accordance with the duplex mode, downlink control information in the first control resource set according to the first search space set.

Another apparatus for wireless communication at a UE is described. The apparatus may include means for receiving an indication that a duplex mode is associated with a control resource set, a search space set, or both, identifying a first search space set including one or more symbols of a first control resource set, where the indication pertains to at least one of the first search space set or the first control resource set, and receiving, in accordance with the duplex mode, downlink control information in the first control resource set according to the first search space set.

A non-transitory computer-readable medium storing code for wireless communication at a UE is described. The code may include instructions executable by a processor to receive an indication that a duplex mode is associated with a control resource set, a search space set, or both, identify a first search space set including one or more symbols of a first control resource set, where the indication pertains to at least one of the first search space set or the first control resource set, and receive, in accordance with the duplex mode, downlink control information in the first control resource set according to the first search space set.

In some examples of the method, apparatuses, and non-transitory computer-readable medium described herein, receiving the indication may include operations, features, means, or instructions for receiving a configuration for the first control resource set, where the configuration includes the indication. In some examples of the method, apparatuses, and non-transitory computer-readable medium described herein, receiving the indication may include operations, features, means, or instructions for receiving a second configuration for the first search space set, where the second configuration includes the indication. Some examples of the method, apparatuses, and non-transitory computer-readable medium described herein may further include operations, features, means, or instructions for determining a search space set identification associated with the first search space set based on the received second configuration, where the indication may be associated with the first search space set identification within the first control resource set.

Some examples of the method, apparatuses, and non-transitory computer-readable medium described herein may further include operations, features, means, or instructions for identifying a search space set type based on the first search space set, where the indication may be associated with the search space set type. In some examples of the method, apparatuses, and non-transitory computer-readable medium described herein, the search space set type may be identified based on information scheduled by a physical downlink control channel transmitted within the first search space set. In some examples of the method, apparatuses, and non-transitory computer-readable medium described herein, the indication may be associated with the search space set type across a set of control resource sets. In some examples of the method, apparatuses, and non-transitory computer-readable medium described herein, the indication may be associated with the search space set type within the first control resource set.

In some examples of the method, apparatuses, and non-transitory computer-readable medium described herein, the duplex mode includes a full duplex mode in which the UE may be capable of simultaneously receiving the downlink control information from a first serving base station and transmitting to a second serving base station using a same time-frequency resource. In some examples of the method, apparatuses, and non-transitory computer-readable medium described herein, the first serving base station and the second serving base station include a same serving base station.

In some examples of the method, apparatuses, and non-transitory computer-readable medium described herein, the duplex mode includes a half duplex mode in which the UE may be capable receiving the downlink control information from a first serving base station and transmitting to a second serving base station using different time-frequency resources or different time resources. In some examples of the method, apparatuses, and non-transitory computer-readable medium described herein, the duplex mode includes a hybrid duplex mode in which the UE may be capable of either simultaneously receiving the downlink control information from a first serving base station and transmitting to a second serving base station using a same time-frequency resource, or in which the UE may be capable of receiving the downlink control information from the first serving base station and transmitting to the second serving base station using different time-frequency resource. Some examples of the method, apparatuses, and non-transitory computer-readable medium described herein may further include operations, features, means, or instructions for identifying an aggregation level corresponding to the first control resource set, where the indication may be associated with the aggregation level.

In some examples of the method, apparatuses, and non-transitory computer-readable medium described herein, receiving the indication may include operations, features, means, or instructions for receiving a first indication of a first duplex mode for the first control resource set, and receiving a second indication of a second duplex mode for the first search space set, where the first duplex mode and the second duplex mode may be different.

In some examples of the method, apparatuses, and non-transitory computer-readable medium described herein, the second duplex mode for the first search space set overrides the first duplex mode for the first control resource set, and the downlink control information may be received based on the second duplex mode. In some examples of the method, apparatuses, and non-transitory computer-readable medium described herein, the first duplex mode for the first control resource set overrides the second duplex mode for the first search space set, and the downlink control information may be received based on the first duplex mode. Some examples of the method, apparatuses, and non-transitory computer-readable medium described herein may further include operations, features, means, or instructions for determining the first duplex mode overrides the second duplex mode, where the downlink control information may be received based on the first duplex mode. Some examples of the method, apparatuses, and non-transitory computer-readable medium described herein may further include operations, features, means, or instructions for determining the second duplex mode overrides the first duplex mode, where the downlink control information may be received based on the second duplex mode.

A method of wireless communication at a base station is described. The method may include transmitting an indication that a duplex mode is associated with a control resource set, a search space set, or both, identifying a first search space set including one or more symbols of a first control resource set, where the indication pertains to at least one of the first search space set or the first control resource set, and transmitting, in accordance with the duplex mode, downlink control information in the first control resource set according to the first search space set.

An apparatus for wireless communication at a base station is described. The apparatus may include a processor, memory coupled with the processor, and instructions stored in the memory. The instructions may be executable by the processor to cause the apparatus to transmit an indication that a duplex mode is associated with a control resource set, a search space set, or both, identify a first search space set including one or more symbols of a first control resource set, where the indication pertains to at least one of the first search space set or the first control resource set, and transmit, in accordance with the duplex mode, downlink control information in the first control resource set according to the first search space set.

Another apparatus for wireless communication at a base station is described. The apparatus may include means for transmitting an indication that a duplex mode is associated with a control resource set, a search space set, or both, identifying a first search space set including one or more symbols of a first control resource set, where the indication pertains to at least one of the first search space set or the first control resource set, and transmitting, in accordance with the duplex mode, downlink control information in the first control resource set according to the first search space set.

A non-transitory computer-readable medium storing code for wireless communication at a base station is described. The code may include instructions executable by a processor to transmit an indication that a duplex mode is associated with a control resource set, a search space set, or both, identify a first search space set including one or more symbols of a first control resource set, where the indication pertains to at least one of the first search space set or the first control resource set, and transmit, in accordance with the duplex mode, downlink control information in the first control resource set according to the first search space set.

In some examples of the method, apparatuses, and non-transitory computer-readable medium described herein, transmitting the indication may include operations, features, means, or instructions for transmitting a configuration for the first control resource set, where the configuration includes the indication. In some examples of the method, apparatuses, and non-transitory computer-readable medium described herein, transmitting the indication may include operations, features, means, or instructions for transmitting a second configuration for the first search space set, where the second configuration includes the indication. Some examples of the method, apparatuses, and non-transitory computer-readable medium described herein may further include operations, features, means, or instructions for determining a search space set identification associated with the first search space set based on the transmitted second configuration, where the indication may be associated with the search space set identification within the first control resource set.

Some examples of the method, apparatuses, and non-transitory computer-readable medium described herein may further include operations, features, means, or instructions for identifying a search space set type based on the first search space set, where the indication may be associated with the search space set type. Some examples of the method, apparatuses, and non-transitory computer-readable medium described herein may further include operations, features, means, or instructions for scheduling a physical downlink control channel, where the search space set type may be identified based on information scheduled by the physical downlink control channel transmitted within the first search space set. In some examples of the method, apparatuses, and non-transitory computer-readable medium described herein, the indication may be associated with the search space set type across a set of control resource sets. In some examples of the method, apparatuses, and non-transitory computer-readable medium described herein, the indication may be associated with the search space set type within the first control resource set.

In some examples of the method, apparatuses, and non-transitory computer-readable medium described herein, the duplex mode includes a full duplex mode in which the UE may be capable of simultaneously receiving the downlink control information from a first serving base station and transmitting to a second serving base station using a same time-frequency resource. In some examples of the method, apparatuses, and non-transitory computer-readable medium described herein, the duplex mode includes a half duplex mode in which the UE may be capable receiving the downlink control information from a first serving base station and transmitting to a second serving base station using different time-frequency resources or different time resources.

In some examples of the method, apparatuses, and non-transitory computer-readable medium described herein, the duplex mode includes a hybrid duplex mode in which the UE may be capable of either simultaneously receiving the downlink control information from a first serving base station and transmitting to a second serving base station using a same time-frequency resource, or in which the UE may be capable of receiving the downlink control information from the first serving base station and transmitting to the second serving base station using different time-frequency resource. Some examples of the method, apparatuses, and non-transitory computer-readable medium described herein may further include operations, features, means, or instructions for identifying an aggregation level corresponding to the first control resource set, where the indication may be associated with the aggregation level.

In some examples of the method, apparatuses, and non-transitory computer-readable medium described herein, transmitting the indication may include operations, features, means, or instructions for transmitting a first indication of a first duplex mode for the first control resource set, and transmitting a second indication of a second duplex mode for the first search space set, where the first duplex mode and the second duplex mode may be different. In some examples of the method, apparatuses, and non-transitory computer-readable medium described herein, the second duplex mode for the first search space set overrides the first duplex mode for the first control resource set, and the downlink control information may be transmitted based on the second duplex mode. In some examples of the method, apparatuses, and non-transitory computer-readable medium described herein, the first duplex mode for the first control resource set overrides the second duplex mode for the first search space set, and the downlink control information may be transmitted based on the first duplex mode.

Some examples of the method, apparatuses, and non-transitory computer-readable medium described herein may further include operations, features, means, or instructions for determining the first duplex mode overrides the second duplex mode, where the downlink control information may be transmitted based on the first duplex mode. Some examples of the method, apparatuses, and non-transitory computer-readable medium described herein may further include operations, features, means, or instructions for determining the second duplex mode overrides the first duplex mode, where the downlink control information may be transmitted based on the second duplex mode.

DETAILED DESCRIPTION

Figure 1:
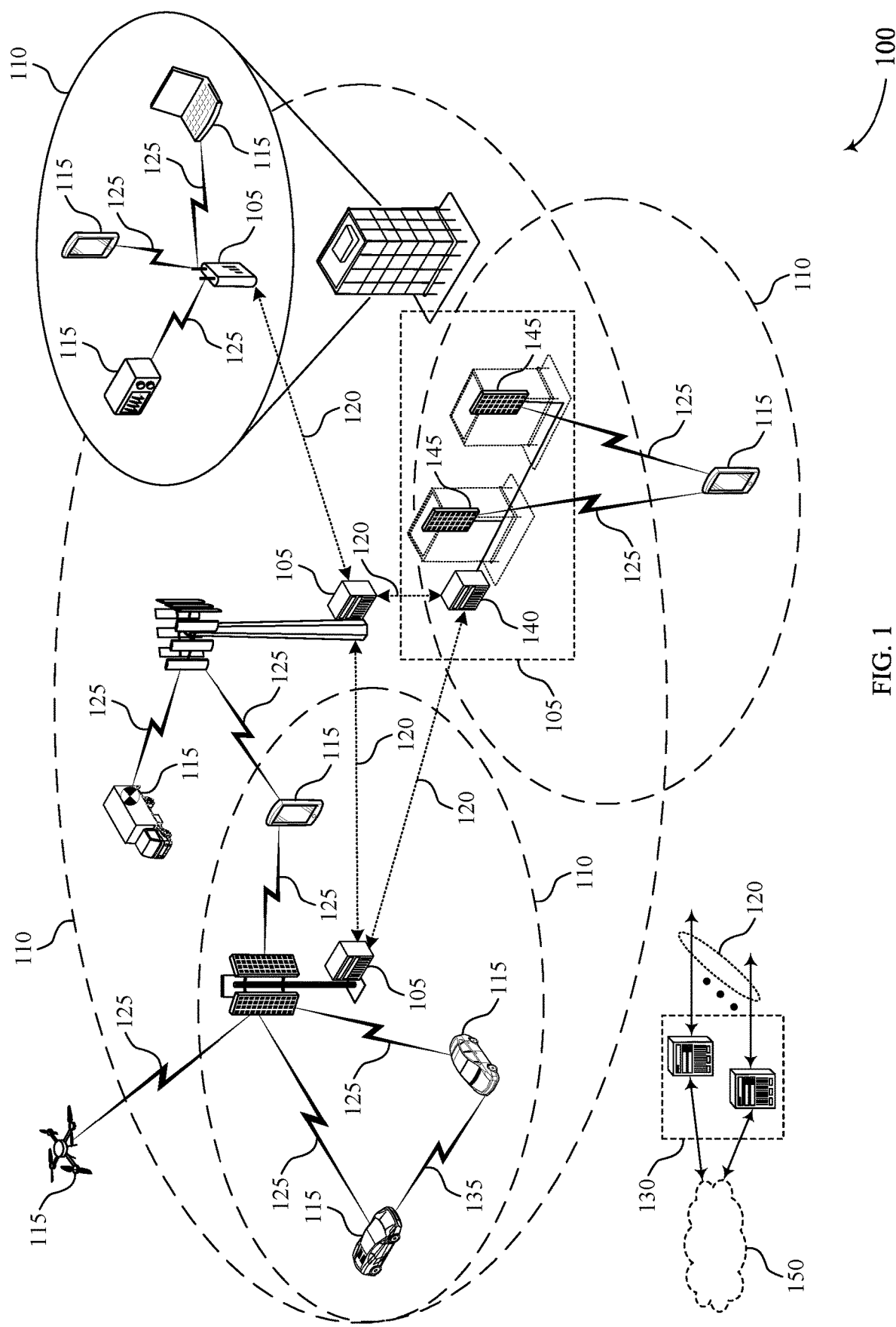
FIG. 1 illustrates an example of a system for wireless communications that supports control resource set (CORESET) and search space (SS) set configuration for full duplex operation in accordance with aspects of the present disclosure.

A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for one or more user equipment (UEs). For example, UEs may monitor or search CORESETs for control information according to one or more search space (SS) sets, and each SS set may include one or multiple control channel candidates in one or more aggregation levels (ALs) arranged in a cascaded manner. An AL for a control channel candidate may refer to a number of control channel resources (e.g., control channel elements (CCEs)) associated with encoded information for a control information format having a given payload size. SS sets may include common SS sets configured for sending control information to multiple UEs and UE-specific SS sets for sending control information to a specific UE. As such, a base station may convey control information to a UE via a configured CORESET and SS set, such that the UE may monitor or search the configured CORESET for the control information according to the configured SS set.

In some cases, wireless devices (e.g., base stations, UEs) may operate in a half duplex mode, in which the wireless device may transmit a signal on a wireless communication link or receive a signal on a wireless communication link, but may not transmit and receive signals concurrently. In some wireless communications systems, wireless full duplex communication may be capable of doubling link capacity by enabling wireless devices to concurrently transmit and receive signals over a same time slot. A wireless device configured for full duplex communications may potentially communicate concurrently on uplink and downlink communication links using the same radio resources. For example, a UE capable of full duplex communication may communicate concurrently on uplink and downlink communication links with different base stations or on uplink and downlink communication links with a same base station.

As such, full duplex operation may significantly increase system throughput for wireless communication networks, and may also reduce the transfer latency for time-critical services. Operating a wireless device in a full duplex mode, however, may result in self-interference at the wireless device, such as interference between a signal that is transmitted by the wireless device and a signal that is concurrently received by the wireless device. In some examples, the transmitted signal may interfere with the received signal if the transmitted signal uses time-frequency resources that overlap with the time-frequency resources used by the received signal. Such self-interference may be particularly problematic when the wireless device is receiving high priority or "critical" transmissions (as self-interference may reduce the likelihood such high priority or critical transmissions are efficiently received).

The techniques described herein may provide for duplex mode configuration for control information. For example, duplex modes may be defined (e.g., as full duplex (FD) capable, FD only, half duplex (HD) only, etc.), and such duplex modes may be configured for CORESETs, SS sets, or both. As such, wireless communications systems may efficiently configure duplex modes for communication of various control information (e.g., wireless communications systems may efficiently configure duplex modes for CORESETs, SS sets, etc. used for various control information).

In some examples, duplex modes configured for a CORESET or SS set may depend on the priority of information conveyed via the CORESET or SS set. For example, a CORESET or SS set for high priority or critical control information (e.g., CORESET #0 for initial access information) may be configured with a HD mode to avoid FD self-interference, while a CORESET or SS set for other control information (e.g., CORESETs for downlink scheduling information) may be configured with a FD mode to improve spectrum efficiency. In some cases, duplex modes may be configured based on the configured AL. Further, techniques for resolving conflicting duplex mode configurations (e.g., HD configuration for a SS set within a CORESET configured with FD) are also described. In one example, a duplex mode for a SS set may override a configured duplex mode for a CORESET (e.g., a duplex mode configured for a SS set may override a duplex mode configuration for the CORESET corresponding to the SS set). In another example, conflicting duplex modes may be resolved based on a comparison (or priority) of the configured duplex modes (e.g., a HD configuration may override a FD configuration, a FD configuration may override a HD configuration, etc.).

Aspects of the disclosure are initially described in the context of a wireless communications system. An example process flow for implementing one or more aspects of the discussed techniques is then described. Aspects of the disclosure are further illustrated by and described with reference to apparatus diagrams, system diagrams, and flowcharts that relate to CORESET and SS set configuration for full duplex operation.

FIG. 1 illustrates an example of a wireless communications system 100 that supports CORESET and SS set configuration for full duplex operation in accordance with aspects of the present disclosure. The wireless communications system 100 may include one or more network devices 105 (such as base stations or access nodes), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The network devices 105 may be dispersed throughout a geographic area to form the wireless communications system 100 and may be devices in different forms or having different capabilities. The network devices 105 and the UEs 115 may wirelessly communicate via one or more communication links 125. Each network device 105 may provide a coverage area 110 over which the UEs 115 and the network device 105 may establish one or more communication links 125. The coverage area 110 may be an example of a geographic area over which a network device 105 and a UE 115 support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, network devices 105, or network equipment (such as core network nodes, relay devices, IAB nodes, or other network equipment), as shown in FIG. 1.

The network devices 105 may communicate with the core network 130, or with one another, or both. For example, the network devices 105 may interface with the core network 130 through one or more backhaul links 120 (such as via an S1, N2, N3, or other interface). The network devices 105 may communicate with one another over the backhaul links 120 (such as via an X2, Xn, or other interface) either directly (such as directly between network devices 105), or indirectly (such as via the core network 130), or both. In some examples, the backhaul links 120 may be or include one or more wireless backhaul links, such as in an IAB network.

One or more of the network devices 105 described herein may include or may be referred to by a person of ordinary skill in the art as a base station, a base transceiver station, a radio base station, an access point, a network node, an access node, an IAB node, a wireless node, a radio transceiver, a NodeB, an eNodeB (eNB), a next-generation NodeB or giga-NodeB (either of which may be referred to as a gNB), a Home NodeB, a Home eNodeB, or other suitable terminology. The wireless communications system 100 may include network devices 105 of different types (such as macro or small cell base stations, donor network devices including a central unit (CU) connected to the core network 130, relay network devices including mobile-termination (MT) functionality and distributed unit (DU) functionality).

The UE 115 may include or may be referred to as a mobile device, a wireless device, a remote device, a handheld device, or a subscriber device, or some other suitable terminology in which the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as other UEs 115 that may sometimes act as relays as well as network devices 105 and network equipment including macro eNBs or gNBs, small cell eNBs or gNBs, or relay base stations, among other examples, as shown in FIG. 1.

The UEs 115 and the network devices 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with the UE 115 using carrier aggregation or multi-carrier operation. The UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a network device 105, or downlink transmissions from a network device 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the network devices 105, UEs 115, or both) may have hardware configurations that support communications over a particular carrier bandwidth or may be configurable to support communications over one of a set of carrier bandwidths. In some examples, the wireless communications system 100 may include network devices 105, UEs 115, or both that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, in which the symbol period and subcarrier spacing are inversely related. The quantity of bits carried by each resource element may depend on the modulation scheme (such as the order of the modulation scheme, the coding rate of the modulation scheme, or both). Thus, the more resource elements that the UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs.

Time intervals for the network devices 105 or the UEs 115 may be expressed in multiples of a basic time unit which may, for example, refer to a sampling period of $T_s = 1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using TDM techniques, FDM techniques, or hybrid TDM-FDM techniques. A control region (such as a CORESET) for a physical control channel may be defined by a number of symbol periods and may extend across the system bandwidth or a subset of the system bandwidth of the carrier. One or more control regions (such as CORESETs) may be configured for a set of the UEs 115. For example, the UEs 115 may monitor or search control regions for control information according to one or more SS sets, and each SS set may include one or multiple control channel candidates in one or more ALs arranged in a cascaded manner. An AL for a control channel candidate may refer to a number of control channel resources (such as CCEs) associated with encoded information for a control information format having a given payload size. SS sets may include common SS sets configured for sending control information to multiple UEs 115 and UE-specific SS sets for sending control information to a specific UE 115.

Each network device 105 may provide communication coverage via one or more cells, for example, a macro cell, a small cell, a hot spot, or other types of cells, or various combinations thereof. The term "cell" may refer to a logical communication entity used for communication with a network device 105 (such as over a carrier) and may be associated with an identifier for distinguishing neighboring cells (such as a physical cell identifier (PCID), a virtual cell identifier (VCID), or others). In some examples, a cell may also refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the network device 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by UEs 115 with service subscriptions with the network provider supporting the macro cell. A small cell may be associated with a lower-powered network device 105, as compared with a macro cell, and a small cell may operate in the same or different (such as licensed, unlicensed) frequency bands as macro cells. Small cells may provide unrestricted access to UEs 115 with service subscriptions with the network provider or may provide restricted access to UEs 115 having an association with the small cell (such as UEs 115 in a closed subscriber group (CSG), or UEs 115 associated with users in a home or office, among other examples). A network device 105 may support one or multiple cells and may also support communications over the one or more cells using one or multiple component carriers.

In some examples, a network device 105 may be movable and therefore provide communication coverage for a moving geographic coverage area 110. In some examples, different geographic coverage areas 110 associated with different technologies may overlap, but the different geographic coverage areas 110 may be supported by the same network device 105. In other examples, the overlapping geographic coverage areas 110 associated with different technologies may be supported by different network devices 105. The wireless communications system 100 may include, for example, a heterogeneous network in which different types of the network devices 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable, low-latency or mission critical communications. UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a network device 105. Other UEs 115 in such a group may be outside the geographic coverage area 110 of a network device 105 or be otherwise unable to receive transmissions from a network device 105. In some examples, groups of UEs 115 communicating via D2D communications may utilize a one-to-many (1:M) system in which each UE 115 transmits to every other UE 115 in the group. In some examples, a network device 105 facilitates the scheduling of resources for D2D communications. In other cases, D2D communications are carried out between UEs 115 without the involvement of a network device 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by network devices 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a network device 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or network device 105 may be distributed across various network devices (such as radio heads and ANCs) or consolidated into a single network device (such as a network device 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as network devices 105 and UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A network device 105 or UE 115 may be equipped with multiple antennas, which may be used to employ techniques such as transmit diversity, receive diversity, multiple-input multiple-output (MIMO) communications, or beamforming. The antennas of a network device 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (such as a network device 105 or a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A network device 105 or UE 115 may use beam sweeping techniques as part of beam forming operations. For example, a network device 105 may use multiple antennas or antenna arrays (such as antenna panels) to conduct beamforming operations for directional communications with a UE 115. Some signals (such as synchronization signals, reference signals, beam selection signals, or other control signals) may be transmitted by a network device 105 multiple times in different directions. For example, the network device 105 may transmit a signal according to different beamforming weight sets associated with different directions of transmission. Transmissions in different beam directions may be used to identify (such as by a transmitting device, such as a network device 105, or a receiving device, such as a UE 115) a beam direction for subsequent transmission or reception by the network device 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

Network devices 105 may support functionality for IAB network operation. For example, network devices 105 may be split into support entities (such as functionalities) for promoting wireless backhaul density in collaboration with NR communication access. In some examples, a network device 105 (such as a donor network device or donor IAB node) may be split into associated CU and DU entities, in which one or more DUs may be partially controlled by an associated CU. The CU entity of the network device 105 may facilitate connection between the core network 130 and the network device (such as an access node), for example, via a wireline or wireless connection to the core network 130. The one or more DUs of the network device 105 may control or schedule functionality for additional devices (such as one or more alternative network devices 105 or UEs 115) according to configured access and backhaul links. Based on supported CU and DU entities at a network device 105, such a network device 105 may be referred to as a donor base station (such as an IAB donor or donor node).

Additionally, in some examples, a network device 105 may be split into associated MT and base station DU entities, in which the MT functionality of the network device 105 may be controlled or scheduled by the DU entities of the one or more donor base stations (such as via a Uu interface). DUs associated with such a network device 105 may be controlled by MT functionality. In addition, DUs of the network device 105 may be partially controlled by signaling messages from CU entities of associated donor network devices (such as donor nodes) on the configured access and backhaul links of a network connection (such as via an F1-application protocol (AP)). The DUs of the one or more network devices 105 may support one of multiple serving cells of a network coverage area. The DUs of the one or more network devices 105 may control or schedule functionality for additional devices (such as one or more alternative network devices 105, UEs 115) according to configured access and backhaul links. Based on supported MT and DU entities at a network device 105, such a network device may be referred to as an intermediate access node (such as an IAB relay node).

In some examples, wireless devices (e.g., network devices 105, UEs 115) may operate in a half duplex mode, in which the wireless devices may transmit a signal on a wireless communication link or receive a signal on a wireless communication link, but may not transmit and receive signals concurrently. In some wireless communications systems (such as wireless communications system 100), wireless full duplex communication may be capable of doubling link capacity by enabling wireless devices to concurrently transmit and receive signals over a same time slot. A wireless device configured for full duplex communications may potentially communicate concurrently on uplink and downlink communication links using the same radio resources. For example, a UE 115 capable of full duplex communication may communicate concurrently on uplink and downlink communication links with different network devices 105 or on uplink and downlink communication links with a same network device 105.

Wireless communications system 100 may implement one or more aspects of the techniques described herein to configure duplex modes for conveyance of control information (e.g., to configure duplex modes for communication of various downlink control information). For example, duplex modes may be defined (e.g., as FD capable, FD only, HD only, etc.), and such duplex modes may be configured for CORESETs, SS sets, or both. As such, wireless communications system 100 may efficiently configure duplex modes for communication of various control information (e.g., wireless communications system 100 may efficiently configure duplex modes for CORESETs, SS sets, etc. used for various control information). As such, wireless communications system 100 may efficiently leverage full duplex communications and resulting spectrum efficiencies for some control information (e.g., such as downlink scheduling information), while mitigating full duplex self-interference (e.g., via half duplex configuration) for other control information (e.g., for high priority or critical control information, such as initial access control information).

Figure 2A:
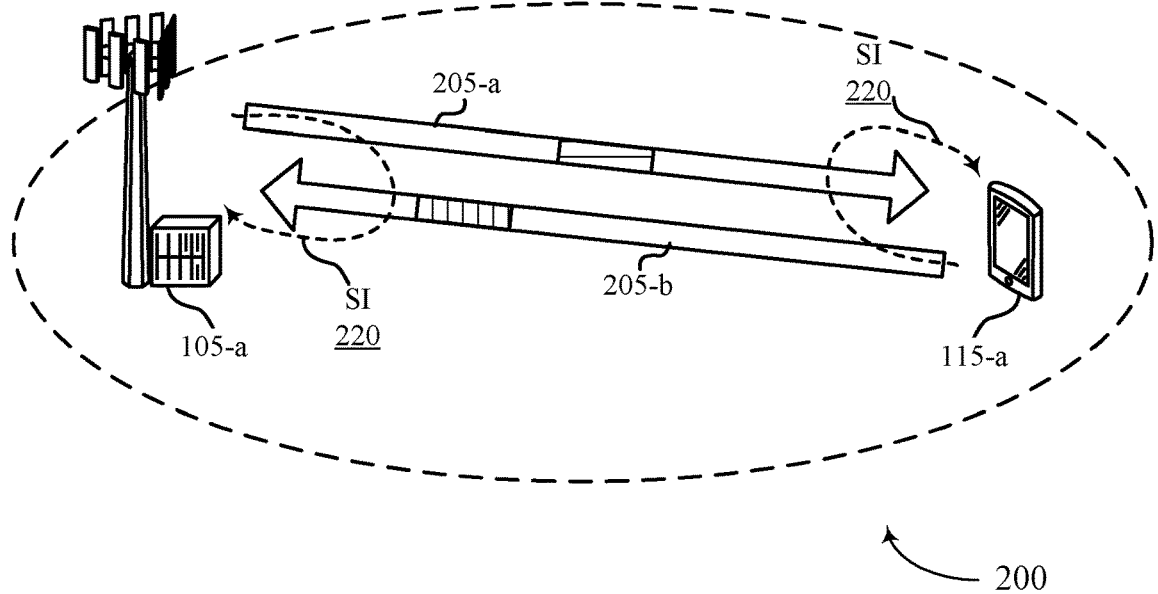
FIG. 2A illustrates an example of a wireless communications system that supports CORESET and SS set configuration for full duplex operation in accordance with aspects of the present disclosure.

FIG. 2A illustrates an example of a wireless communications system 200 that supports CORESET and SS set configuration for full duplex operation in accordance with aspects of the present disclosure. In some examples, wireless communications system 200 may implement aspects of wireless communications system 100. Wireless communications system 200 may include a base station 105a and a UE 115a, which may be examples of corresponding network devices 105 and UEs 115, respectively, as described above with reference to FIG. 1. Additionally, wireless communications system 200 may illustrate communications between base station 105a and a full duplex capable UE 115a.

Figure 2B:
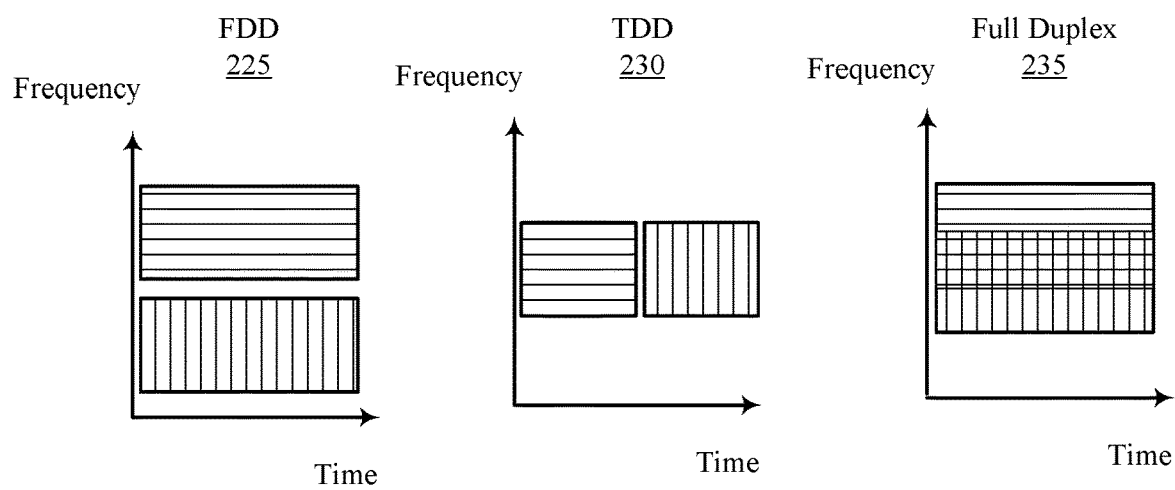
FIG. 2B illustrates example duplexing schemes that support CORESET and SS set configuration for full duplex operation in accordance with aspects of the present disclosure.

FIG. 2B illustrates example duplexing schemes (e.g., example FDD scheme 225, example TDD scheme 230, and example full duplex scheme 235) that support CORESET and SS set configuration for full duplex operation in accordance with aspects of the present disclosure. In some examples, FDD scheme 225, TDD scheme 230, and full duplex scheme 235 may implement aspects of techniques implemented by wireless communications system 100 and/or wireless communications system 200. For example, wireless communications system 200 may illustrate communications between base station 105a and a full duplex capable UE 115a, where UE 115a may be configured to operate according to a FDD scheme 225, TDD scheme 230, or full duplex scheme 235 for various communications. According to the techniques described herein, wireless communications system 200 may support duplex mode configuration (e.g., configuration according to FDD scheme 225, TDD scheme 230, and/or full duplex scheme 235) for control information (e.g., duplex mode configuration for communication of downlink control information).

For example, UE 115a may be capable of receiving downlink information 210 on resources of a carrier 205a from base station 105a and of transmitting uplink information 215 on resources of a carrier 205b to base station 105a, where carriers 205a and 205b may include a same time-frequency radio resource for the uplink information 215 and downlink information 210. When configured for full duplex scheme 235, UE 115a may hear (e.g., receive downlink information 210) and talk (e.g., transmit uplink information 215) simultaneously (concurrently) in the same frequency bandwidth. In some cases, transmit (e.g., carrier 205b) and receive (e.g., carrier 205a) may be partially full duplexed in the frequency domain. In some cases, a single carrier 205 may support the full duplex scheme 235 (such that downlink information 210 may be received and uplink information 215 may be transmitted concurrently via a single carrier 205).

FDD and TDD may be half duplex (HD). When configured for FDD scheme 225, carriers 205 may carry either downlink or uplink communications. For example, carrier 205a may include frequency resources for downlink communications and carrier 205b may include different frequency resources for uplink communications. When configured for TDD scheme 230, a carrier 205 may carry both downlink or uplink communications, however the carrier may carry either downlink or uplink communications in a given time interval. For example, carrier 205a may include time resources for downlink communications and may include different time resources for uplink communications (where the downlink or uplink communications may be sent over the same frequency resources, at different times).

In some cases, full duplex (e.g., a full duplex scheme 235) may be adopted at both the base station 105a and the UE 115a. As discussed herein, full duplex scheme 235 may increase system throughput for wireless communications system 200, and may also reduce the transfer latency for time-critical services. In some cases, base station 105a may include a set of downlink antenna(s) and a set of uplink antenna(s). These two antenna sets may be located remotely from each other to reduce their inter-talk interference. Additionally or alternatively, the two antenna sets may be located closely to each other or be integrated as one antenna set if the inter-talk interference can be mitigated at a sufficiently high degree. In some cases, the two antenna sets may be separate base stations 105 where UE 115a may communicate with the two base stations 105 in both uplink and downlink directions at the same time. That is, as used herein, full duplex mode may refer to a mode in which the UE 115a is capable of simultaneously receiving downlink control information from base station 105a and transmitting to the base station 105a using a same time-frequency resource, a mode in which the UE 115a is capable of simultaneously receiving downlink control information from base station 105a and transmitting to a different base station 105 using a same time-frequency resource, or a mode in which the UE 115a is capable of simultaneously transmitting to the base station 105a and receiving downlink control information from a different base station 105 using a same time-frequency resource.

However, full duplex scheme 235 may result in device self-interference (SI) 220 due to the concurrent transmission of uplink information 215 and reception of downlink information 210 in overlapping bandwidth. For example, transmission of uplink information 215 may interfere with reception of downlink information 210 due to the power of the transmitted signal and the relative diminished power (due to path loss) of the received signal. In some cases, such self-interference 220 may result in lossy or failed communications. Mitigation of self-interference 220 may rely on transmit/receive (Tx/Rx) signal isolation and cancellation of Tx signal from the Rx signal (mitigation of self-interference 220 may rely on signal processing techniques to correct for distortion of a received downlink signal arising from transmission of a concurrently transmitted uplink signal). For Tx/Rx signal isolation, spatial isolation techniques may be employed by properly controlling directions of the Tx and Rx beam.

The techniques described herein may provide for duplex mode configuration for control information (e.g., duplex mode configuration for communication of downlink information 210 such as downlink control information). For example, duplex modes may be defined (e.g., as FD capable where the resource is flexible for both FD and HD, FD only, HD only, etc.), and such duplex modes may be configured for CORESETs, SS sets, or both. As such, wireless communications system 200 may efficiently configure duplex modes for communication of various control information (e.g., wireless communications system 200 may efficiently configure duplex modes for CORESETs, SS sets, etc. used for various control information). In some examples, duplex modes configured for a CORESET or SS set may depend on the priority of information conveyed via the CORESET or SS set. For example, a CORESET or SS set for high priority or critical control information (e.g., CORESET #0 for downlink information 210 such as initial access information) may be configured with a HD mode (e.g., such as FDD scheme 225, TDD scheme 230) to avoid FD self-interference. Further, a CORESET or SS set for other control information (e.g., CORESETs for downlink information 210 such as downlink scheduling information) may be configured with a FD mode (e.g., such as full duplex scheme 235) to improve spectrum efficiency.

In some cases, duplex modes may be configured based on the configured AL. Additionally, wireless communications system 200 may employ techniques for resolving conflicting duplex mode configurations (e.g., such as when HD is configured for a SS set corresponding to a CORESET configured with FD). In one example, a duplex mode for a SS set may override a configured duplex mode for a CORESET (e.g., a duplex mode configured for a SS set may override a duplex mode configuration for the CORESET corresponding to the SS set). In another example, conflicting duplex modes may be resolved based on a comparison (or priority) of the configured duplex modes (e.g., a HD configuration may override a FD configuration, a FD configuration may override a HD configuration, etc.).

In some cases, in order to receive physical downlink control channel (PDCCH), UE 115a may be configured with time-frequency resources to blind decode. A CORESET may define the frequency domain resource blocks (RBs) and time domain duration (e.g., number of consecutive symbols) of the control region with which PDCCH is monitored. In some cases, there may be different types of CORESETs, such as CORESET #0 (a default CORESET with ID=0 that is configured by master information block (MIB)) and CORESET(s) with non-zero ID configured by dedicated RRC signaling.

A SS set associated with a CORESET may define the slot pattern and starting symbol of the control region in each slot of the pattern. In some cases, there may be different types of SS sets, such as Type0-PDCCH common search space (CSS) set for PDCCH scheduling system information block 1 (SIB1), Type0A-PDCCH CSS set for PDCCH scheduling other system information (OSI), Type1-PDCCH CSS set for PDCCH related to random access, Type2-PDCCH CSS set for PDCCH scheduling page message, Type3-PDCCH CSS set for all the other PDCCHs monitored in CSS, UE specific search space (USS) set for PDCCH scheduling UE specific data, etc. As such, a CORESET may generally indicate a number of RBs and symbols, and a SS set may indicate a pattern of resource blocks and symbols over time within the CORESET. In some cases, there may be a limit for the number of CORESETs and a limit for the number of SS sets in the active bandwidth part (BWP) configured to the UE 115a.

CORESET configuration (e.g., for a UE 115a) may include a spatial property (e.g., QCL-TypeD) of the antenna port over which PDCCH is received and demodulation reference signal (DMRS) scrambling sequence configuration for the PDCCH DRMS that facilitates interference mitigation between CORESET and other channels/signals for the same UE or for the other UEs scrambled with different sequences. Such CORESET configuration including spatial property and DMRS scrambling sequence configuration may enable beamforming of PDCCH. Since full duplex self-interference mitigation may rely on spatial domain operation (e.g., for Tx/Rx spatial isolation), wireless communications system 200 may configure an additional FD property (e.g., wireless communications system 200 may support configuration of duplex modes) defined in CORESET configuration.

Further, SS set type may be determined by the information scheduled by PDCCH transmitted within the SS set. For different information, receiver performance requirements may be different which may allow different duplex modes (e.g., FD or HD) for the corresponding SS set. As such, wireless communications system 200 may additionally or alternatively configure an additional FD property (e.g., wireless communications system 200 may support configuration of duplex modes) defined in SS set configuration. As discussed herein, some control information (e.g., such as initial access information, system information, etc.) may be prioritized (e.g., may be high priority or critical control information for efficient system operation, relative to other control information). In such cases, HD modes may be configured for such higher priority control information, as such higher priority control information may be too important to risk potential adverse consequences of self-interference arising from full duplex operation. Further, other control information such as downlink scheduling information, etc. may be less critical to overall system performance, and FD modes may be enabled for such other control information realize spectrum efficiencies. Accordingly, SS set types may be configured with different duplex modes depending on the information scheduled by PDCCH within the SS set (e.g., Type0-PDCCH CSS set may be configured with HD mode and USS set for PDCCH scheduling UE specific data may be configured with FD mode).

Various duplex modes may be defined or configurable within wireless communications system 200. For example, configurable duplex modes may include FD capable (where UE 115a may support PDCCH monitoring in FD and HD symbols), FD only (where UE 115a may support PDCCH monitoring in FD symbols only, which may improve spectrum efficiency), HD only (where UE 115a may support PDCCH monitoring in HD symbols only, which may be configured for high priority information where potential self-interference from FD is to be avoided), etc. Various other duplex modes are considered by analogy, without departing from the scope of the present disclosure.

In some examples, for each CORESET, the network (e.g., wireless communications system 200, base station 105a, etc.) may indicate the duplex mode among a set of duplex modes (e.g., for each CORESET, the network may configure a duplex mode from a set of FD capable, FD only, and HD only modes). The network may configure CORESET(s) with different duplex modes (based on the information conveyed via the CORESET). For example, if the network configures 3 CORESETs (e.g., CORESETs 1/2/3), the network may indicate CORESET ID 1 is for FD capable while CORESET ID 2/3 is for HD only. In some examples, MIB may include the indication of duplex modes for the various CORESETs (e.g., for CORESET #0 and for additional CORESETs). In some cases, the duplex modes for various CORESETs may be preconfigured by the network (such that UE 115a may implicitly derive the duplex mode based on which CORESETs are configured.

In some examples, for each SS set, the network may indicate the duplex mode. In some cases, the duplex mode may be indicated for each SS set ID (e.g., the duplex mode for the SS set may only be valid within in a CORESET). In some cases, the duplex mode may be indicated for each SS set type within a CORESET or for each SS set type across CORESETs. That is, duplex modes may be configured for SS set types on an individual CORESET basis, or duplex modes may be configured for SS set types across all CORESETs.

In some implementations, wireless communications system 100 (e.g., the network) may define restriction rules for ALs for each duplex mode (e.g., wireless communications system 100 may indicate or preconfigure which AL can be monitored for each duplex mode). As discussed, each SS set may include one or multiple control channel candidates in one or more ALs (e.g., one or more numbers of CCEs associated with encoded information for a control information format having a given payload size) arranged in a cascaded manner. In some cases, duplex modes may be configurable based on the AL being monitored. For example, in some cases, AL 1,2 and 4 PDCCHs may be monitored in HD only mode and AL 4,8 and 16 PDCCHs may be monitored in FD only mode. In other examples, AL 1,2 and 4 PDCCHs may be monitored in FD only mode and AL 4,8 and 16 PDCCHs may be monitored in HD only mode. In some cases, the configuration of duplex modes based on the AL being monitored may consider coding redundancy, robustness to interference, actual or estimated uplink and downlink power differences at UE 115a, etc.

Further, wireless communications system 200 may employ techniques for resolving potential conflicting duplex mode configurations (e.g., techniques for handling scenarios where the network indicates duplex mode for a CORESET and a duplex mode to a SS set that is associated with the CORESET, where the two duplex modes are different). In some cases, UE 115a may be configured such that the duplex mode for the SS set may override the duplex mode for the CORESET. In some cases, UE 115a may be configured such that the CORESET duplex mode may override the SS set duplex mode. In some cases, some duplex modes may be prioritized or hold weight over other duplex modes (such that UE 115a may compare any overlapping duplex mode configurations, and determine a duplex mode configuration based on relative priority or weighting of the configured duplex modes). For example, in some cases, UE 115a may use HD only if one of the two duplex modes is HD only (HD only mode may override other duplex modes). In some examples, UE 115a may use FD capable if one is FD capable and the other one is FD only (if two configured duplex modes include FD capable and FD only, the UE 115a may implement a FD capable mode). Various prioritization, overriding rules, etc. for resolving differing duplex mode configurations are contemplated by analogy, without departing from the scope of the present disclosure.

Generally, a network may define any number of duplex modes, and such duplex modes may be configured for control information communication using the techniques described herein (e.g., via CORESET configuration, SS set configuration, etc.). Further, various duplex modes that may be defined by a network may be associated with various priority or weighting based on system needs, such that scenarios where differing duplex modes are configured (e.g., for a CORESET and a SS set) may be handled differently according to system needs, according to duplex mode definitions, etc. As such, the examples described herein are done so for illustrative purposes. Various implementations of the techniques described herein are considered by analogy, without departing from the scope of the present disclosure. For example, differing duplex mode definitions, different rules for application of configured duplex modes, etc. may be employed based on system needs and implementation details (such as coding redundancy, criticalness of control information, encoding robustness to interference, directional transmission considerations, actual or estimated uplink and downlink power differences at UE 115a, etc.).

Figure 3:
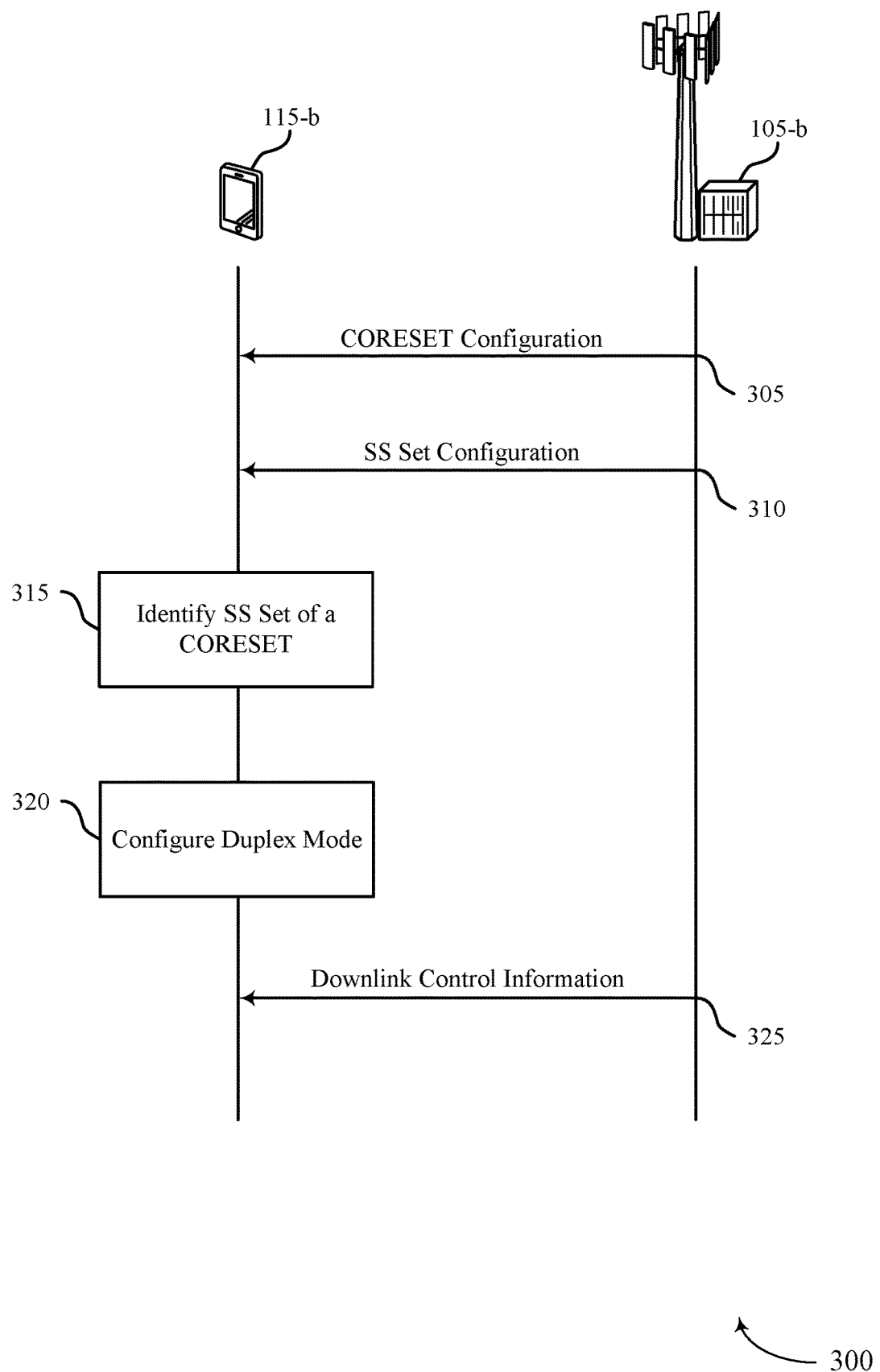
FIG. 3 illustrates an example of a process flow that supports CORESET and SS set configuration for full duplex operation in accordance with aspects of the present disclosure.

FIG. 3 illustrates an example of a process flow 300 that supports CORESET and SS set configuration for full duplex operation in accordance with aspects of the present disclosure. In some examples, process flow 300 may implement aspects of wireless communications systems 100 and/or 200. Process flow 300 may include a base station 105b and a UE 115b, which may be examples of corresponding network devices 105 and UEs 115, respectively, as described above with reference to FIGS. 1 and 2. As described herein, UE 115b may be a full duplex capable UE 115. Process flow 300 may illustrate UE 115b receiving a configuration to receive downlink control information according to a first CORESET and a first SS set. As described herein, the UE 115b may further receive an indication of a duplex mode associated with the first CORESET, the first SS set, or both (e.g., UE 115b may receive an indication of a duplex mode associated with the first CORESET, an indication of a duplex mode associated with the first SS set, an indication of a duplex mode associated with the first CORESET and the first SS set, etc.). UE 115b may configure a duplex mode based on the one or more duplex mode indications, and may receive the downlink control information, based on the configured duplex mode, according to the configured first CORESET and first SS set.

In the following description of the process flow 300, the operations between UE 115b and base station 105b may be transmitted in a different order than the order shown, or the operations performed by base station 105b and UE 115b may be performed in different orders or at different times. Certain operations may also be left out of the process flow 300, or other operations may be added to the process flow 300. It is to be understood that while base station 105b and UE 115b are shown performing a number of the operations of process flow 300, any wireless device may perform the operations shown.

At 305, base station 105b transmit a configuration for a first CORESET.

At 310, base station 105b transmit a second configuration for a first SS set.

At 315, UE 115b may identify the first SS set comprising one or more symbols of the first CORESET based on the configuration for the first CORESET and the second configuration for the first SS set received at 305 and 310. For example, UE 115b may identify one or multiple control channel candidates, in one or more ALs, of the configured CORESET according to the configured SS set.

At 320, UE 115b may configure a duplex mode for receiving downlink control information (e.g., for receiving downlink control information according to the first CORESET and first SS set identified at 315). UE 115b may receive an indication that a duplex mode is associated with (pertains to) a CORESET, a SS set, or both. For example, the configuration for the first CORESET, the second configuration for the SS set, or both, may include an indication of a duplex mode. As discussed herein, UE 115b may receive such duplex mode indication(s), and may configure a duplex mode at 320 accordingly.

For example, in some cases, UE 115b may receive a first indication of a first duplex mode for the first CORESET and receive a second indication of a second duplex mode for the first SS set (where the first duplex mode and the second duplex mode are different). In some cases, the first indication and the second indication may be received in the configuration for the first CORESET and in the second configuration for the first SS set, respectively. In some cases, the first indication and the second indication may both be received in the configuration for the first CORESET (e.g., duplex mode configuration for various CORESETs, SS sets, ALs, or some combination thereof may be dynamically indicated by a CORESET configuration, a SS set configuration, or both). In some cases, the first indication and the second indication may be pre-specified or preconfigured by the network (e.g., duplex mode configuration for various CORESETs, SS sets, ALs, or some combination thereof may be pre-specified or preconfigured by the network). In some cases, the first indication and the second indication may be semi-statically configured (e.g., via RRC signaling) by the network (e.g., duplex mode configuration for various CORESETs, SS sets, ALs, or some combination thereof may be semi-statically configured by the network).

In some cases, the second duplex mode for the first SS set may override the first duplex mode for the first CORESET (and the downlink control information may be received based on the second duplex mode). In some cases, the first duplex mode for the first CORESET may override the second duplex mode for the first SS set (and the downlink control information may be received based on the first duplex mode). In some examples, UE 115b may determine that the first duplex mode overrides the second duplex mode or that the second duplex mode overrides the first duplex mode (and the UE 115b may configure the duplex mode accordingly).

In some cases, UE 115b may determine a SS set ID associated with the first SS set based on the received second configuration, where the duplex mode indication may be associated with the first SS set ID within the first CORESET. In some cases, UE 115*b* may identify a SS set type based on the first SS set, where the duplex mode indication may be associated with the SS set type. For example, UE 115*b* may identify the SS set type based on information scheduled by a PDCCH transmitted within the first SS set (the SS set type may indicate type or relative priority of information scheduled by the SS set, and the duplex mode configuration may depend on the type or relative priority of information scheduled by the SS set). In some cases, the duplex mode indication may be associated with the SS set type across a plurality of CORESETs (e.g., duplex modes may be configured for SS set types across several or all CORESETs). In some cases, the duplex mode indication may be associated with the SS set type within the first CORESET (e.g., duplex modes may be configured for SS set types on a per CORESET basis).

In some cases, UE 115*b* may identify an AL corresponding to the first CORESET (e.g., associated with the first SS set), where the duplex mode indication may be associated with the AL (duplex modes may be configured or restricted for various ALs, as described in more detail herein).

As discussed herein, duplex modes may include, among various other duplex modes, a full duplex mode, a half duplex mode, and a hybrid duplex mode. In a full duplex mode, UE 115*b* may be capable of simultaneously receiving the downlink control information from a first serving base station and transmitting to a second serving base station using a same time-frequency resource. In a half duplex mode, UE 115*b* may be capable of receiving the downlink control information from a first serving base station and transmitting to a second serving base station using different time-frequency resources or different time resources. In a hybrid duplex mode, UE 115*b* may be capable of either simultaneously receiving the downlink control information from a first serving base station and transmitting to a second serving base station using a same time-frequency resource, or in which the UE is capable of receiving the downlink control information from the first serving base station and transmitting to the second serving base station using different time-frequency resource. As discussed herein, the first serving base station and the second serving base station may be a same base station (e.g., such as base station 105*b*), or the first serving base station and the second serving base station may be different base stations 105.

At 325, UE 115*b* may receive, in accordance with the duplex mode configured at 320, downlink control information in the first CORESET according to the first SS set.

Figure 4:
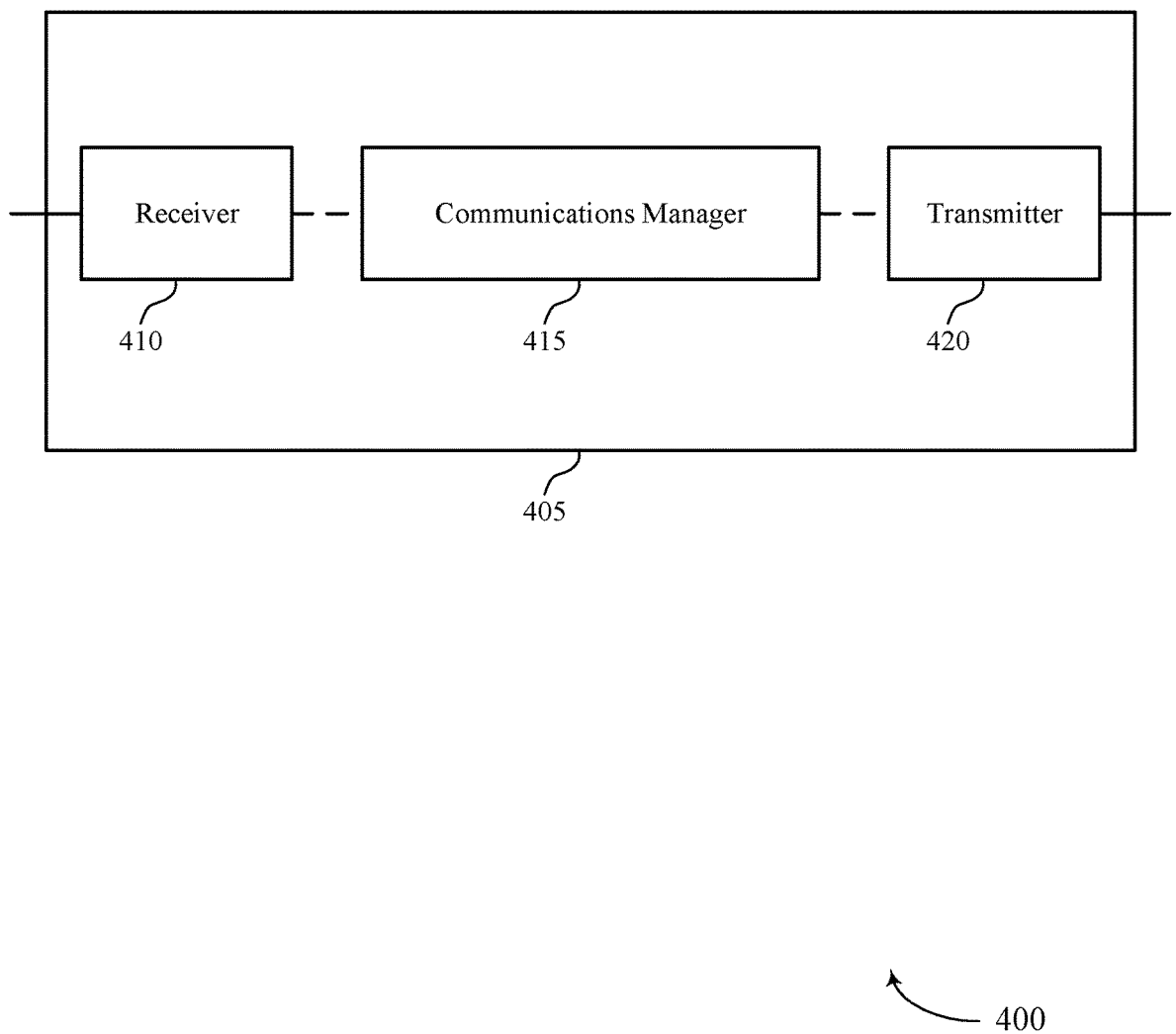
FIGS. 4 and 5 show block diagrams of devices that support CORESET and SS set configuration for full duplex operation in accordance with aspects of the present disclosure.

FIG. 4 shows a block diagram 400 of a device 405 that supports CORESET and SS set configuration for full duplex operation in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to CORESET and SS set configuration for full duplex operation, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive an indication that a duplex mode is associated with a control resource set, a search space set, or both, identify a first search space set including one or more symbols of a first control resource set, where the indication pertains to at least one of the first search space set or the first control resource set, and receive, in accordance with the duplex mode, downlink control information in the first control resource set according to the first search space set. The communications manager 415 may be an example of aspects of the communications manager 710 described herein.

The actions performed by the communications manager 415 as described herein may be implemented to realize one or more potential advantages. One implementation may provide improved quality and reliability of service at the UE 115, as self-interference at the wireless device is reduced through duplex mode configuration for control information.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
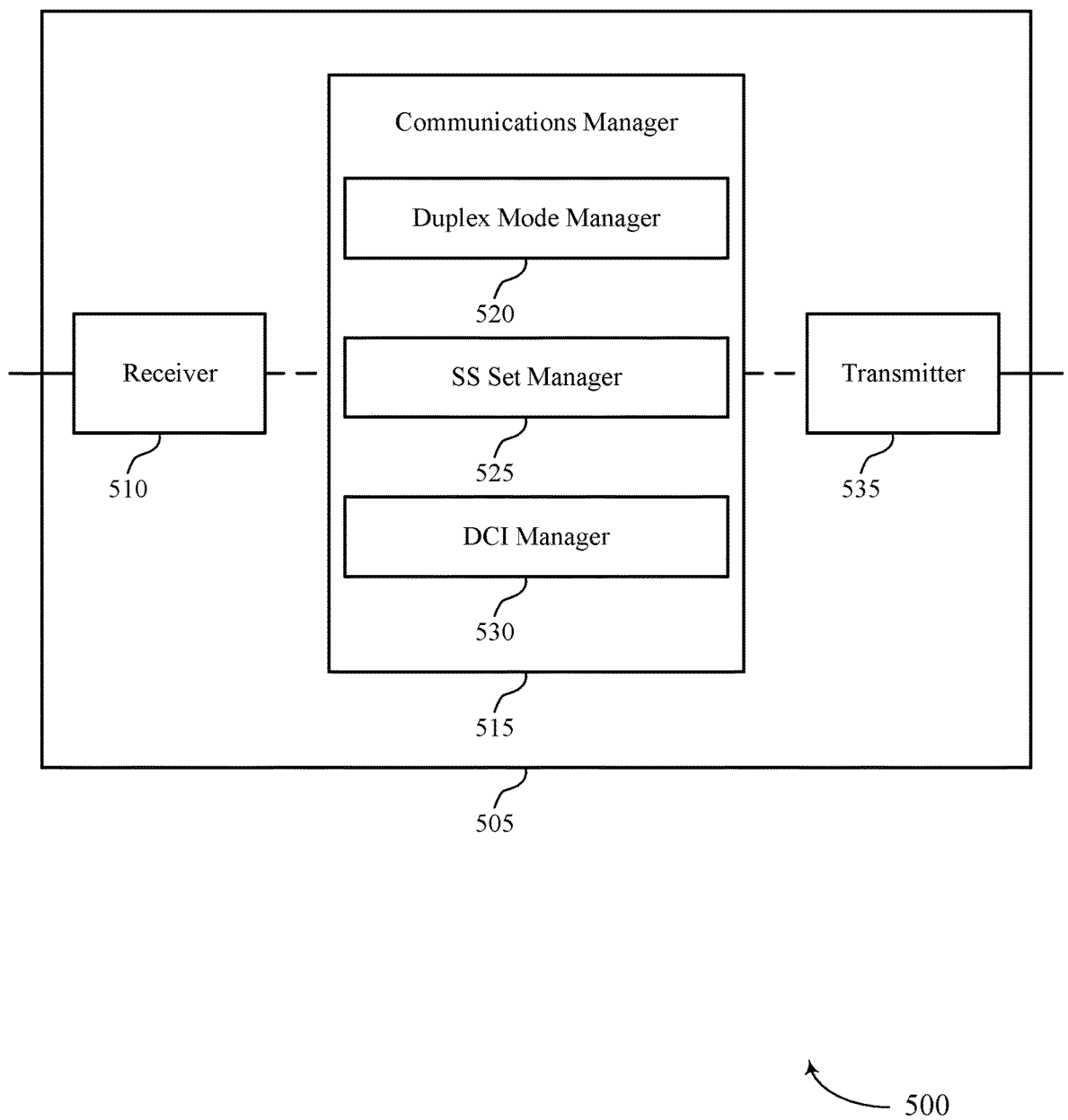

FIG. 5 shows a block diagram 500 of a device 505 that supports CORESET and SS set configuration for full duplex operation in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to CORESET and SS set configuration for full duplex operation, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a duplex mode manager 520, a SS set manager 525, and a DCI manager 530. The communications manager 515 may be an example of aspects of the communications manager 710 described herein.

The duplex mode manager 520 may receive an indication that a duplex mode is associated with a control resource set, a search space set, or both. The SS set manager 525 may identify a first search space set including one or more symbols of a first control resource set, where the indication pertains to at least one of the first search space set or the first control resource set. The DCI manager 530 may receive, in accordance with the duplex mode, downlink control information in the first control resource set according to the first search space set.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
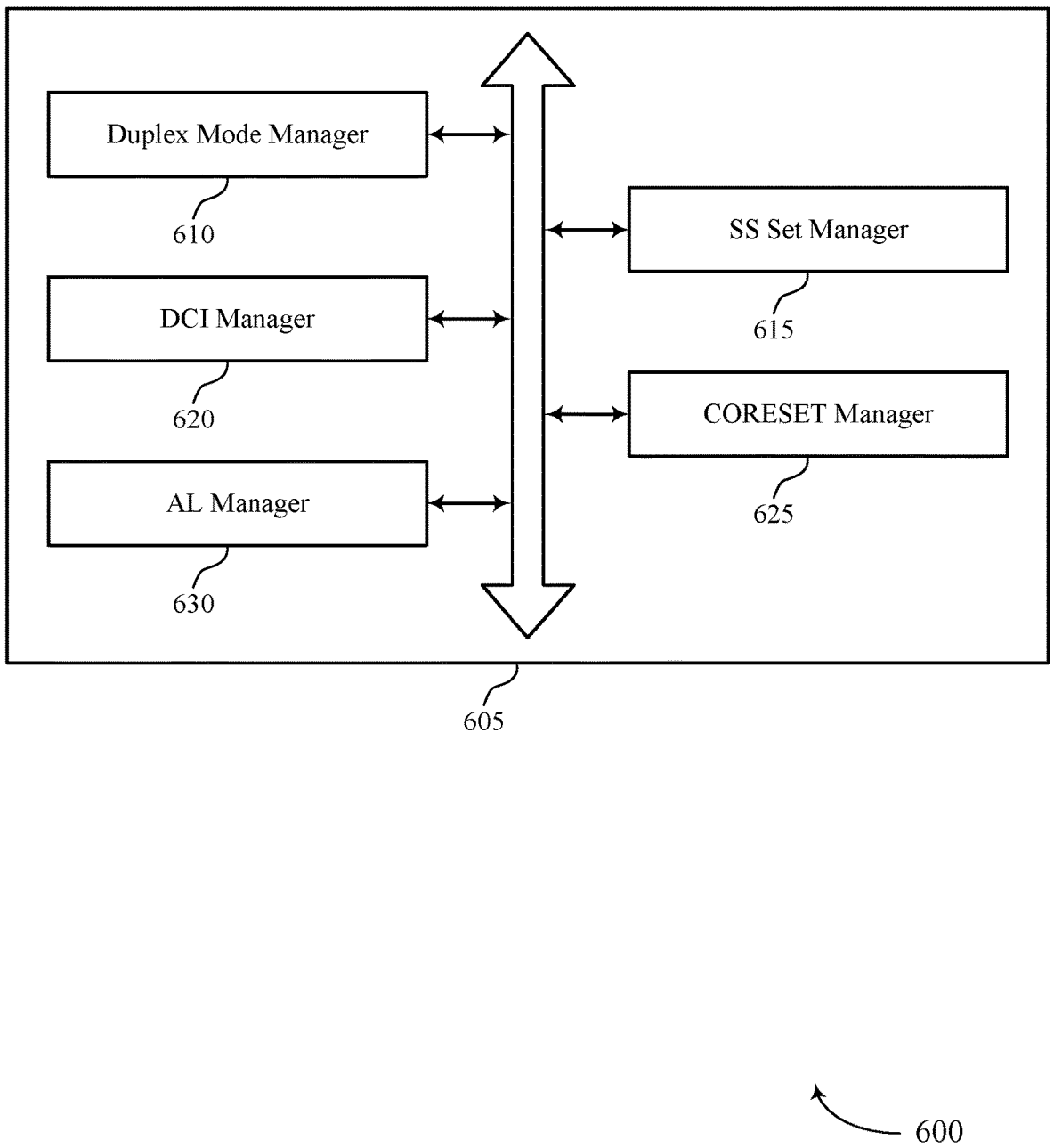
FIG. 6 shows a block diagram of a communications manager that supports CORESET and SS set configuration for full duplex operation in accordance with aspects of the present disclosure.

FIG. 6 shows a block diagram 600 of a communications manager 605 that supports CORESET and SS set configuration for full duplex operation in accordance with aspects of the present disclosure. The communications manager 605 may be an example of aspects of a communications manager 415, a communications manager 515, or a communications manager 710 described herein. The communications manager 605 may include a duplex mode manager 610, a SS set manager 615, a DCI manager 620, a CORESET manager 625, and an AL manager 630. Each of these modules may communicate, directly or indirectly, with one another (e.g., via one or more buses).

The duplex mode manager 610 may receive an indication that a duplex mode is associated with a control resource set, a search space set, or both. In some examples, the duplex mode manager 610 may receive a first indication of a first duplex mode for the first control resource set. In some examples, the duplex mode manager 610 may receive a second indication of a second duplex mode for the first search space set, where the first duplex mode and the second duplex mode are different.

In some examples, the duplex mode manager 610 may determine the first duplex mode overrides the second duplex mode, where the downlink control information is received based on the first duplex mode. In some examples, the duplex mode manager 610 may determine the second duplex mode overrides the first duplex mode, where the downlink control information is received based on the second duplex mode. In some cases, the second duplex mode for the first search space set overrides the first duplex mode for the first control resource set, and the downlink control information is received based on the second duplex mode. In some cases, the first duplex mode for the first control resource set overrides the second duplex mode for the first search space set, and the downlink control information is received based on the first duplex mode.

In some cases, the duplex mode includes a full duplex mode in which the UE is capable of simultaneously receiving the downlink control information from a first serving base station and transmitting to a second serving base station using a same time-frequency resource. In some cases, the duplex mode includes a half duplex mode in which the UE is capable receiving the downlink control information from a first serving base station and transmitting to a second serving base station using different time-frequency resources or different time resources. In some cases, the duplex mode includes a hybrid duplex mode in which the UE is capable of either simultaneously receiving the downlink control information from a first serving base station and transmitting to a second serving base station using a same time-frequency resource, or in which the UE is capable of receiving the downlink control information from the first serving base station and transmitting to the second serving base station using different time-frequency resource. In some cases, the first serving base station and the second serving base station include a same serving base station.

The SS set manager 615 may identify a first search space set including one or more symbols of a first control resource set, where the indication pertains to at least one of the first search space set or the first control resource set. In some examples, SS set manager 615 may receive a second configuration for the first search space set, where the second configuration includes the indication. In some examples, the SS set manager 615 may determine a search space set identification associated with the first search space set based on the received second configuration, where the indication is associated with the first search space set identification within the first control resource set. In some examples, the SS set manager 615 may identify a search space set type based on the first search space set, where the indication is associated with the search space set type. In some cases, the search space set type is identified based on information scheduled by a physical downlink control channel transmitted within the first search space set. In some cases, the indication is associated with the search space set type across a set of control resource sets. In some cases, the indication is associated with the search space set type within the first control resource set.

The DCI manager 620 may receive, in accordance with the duplex mode, downlink control information in the first control resource set according to the first search space set. The CORESET manager 625 may receive a configuration for the first control resource set, where the configuration includes the indication. The AL manager 630 may identify an aggregation level corresponding to the first control resource set, where the indication is associated with the aggregation level.

Figure 7:
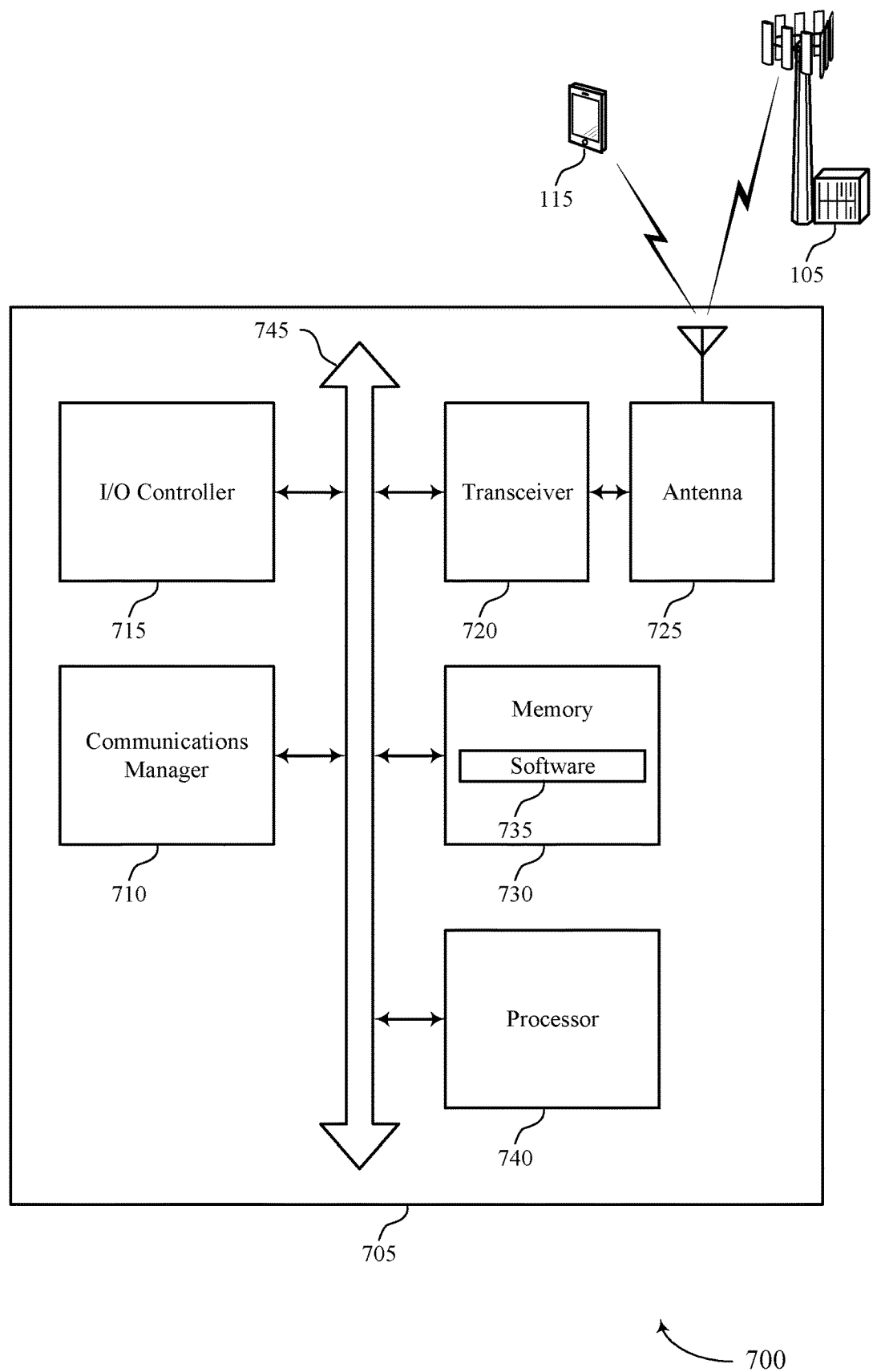
FIG. 7 shows a diagram of a system including a device that supports CORESET and SS set configuration for full duplex operation in accordance with aspects of the present disclosure.

FIG. 7 shows a diagram of a system 700 including a device 705 that supports CORESET and SS set configuration for full duplex operation in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive an indication that a duplex mode is associated with a control resource set, a search space set, or both, identify a first search space set including one or more symbols of a first control resource set, where the indication pertains to at least one of the first search space set or the first control resource set, and receive, in accordance with the duplex mode, downlink control information in the first control resource set according to the first search space set.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code or software 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting CORESET and SS set configuration for full duplex operation).

Based on resolving conflicting duplex modes based on a priority of the configured duplex modes, a UE 115 may be configured with a duplex mode to improve spectrum efficiency, mitigate self-interference, increase system throughput, etc. As such, when a duplex mode is chosen, the processor 740 may be ready to respond more efficiently through the reduction of a ramp up in processing power.

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
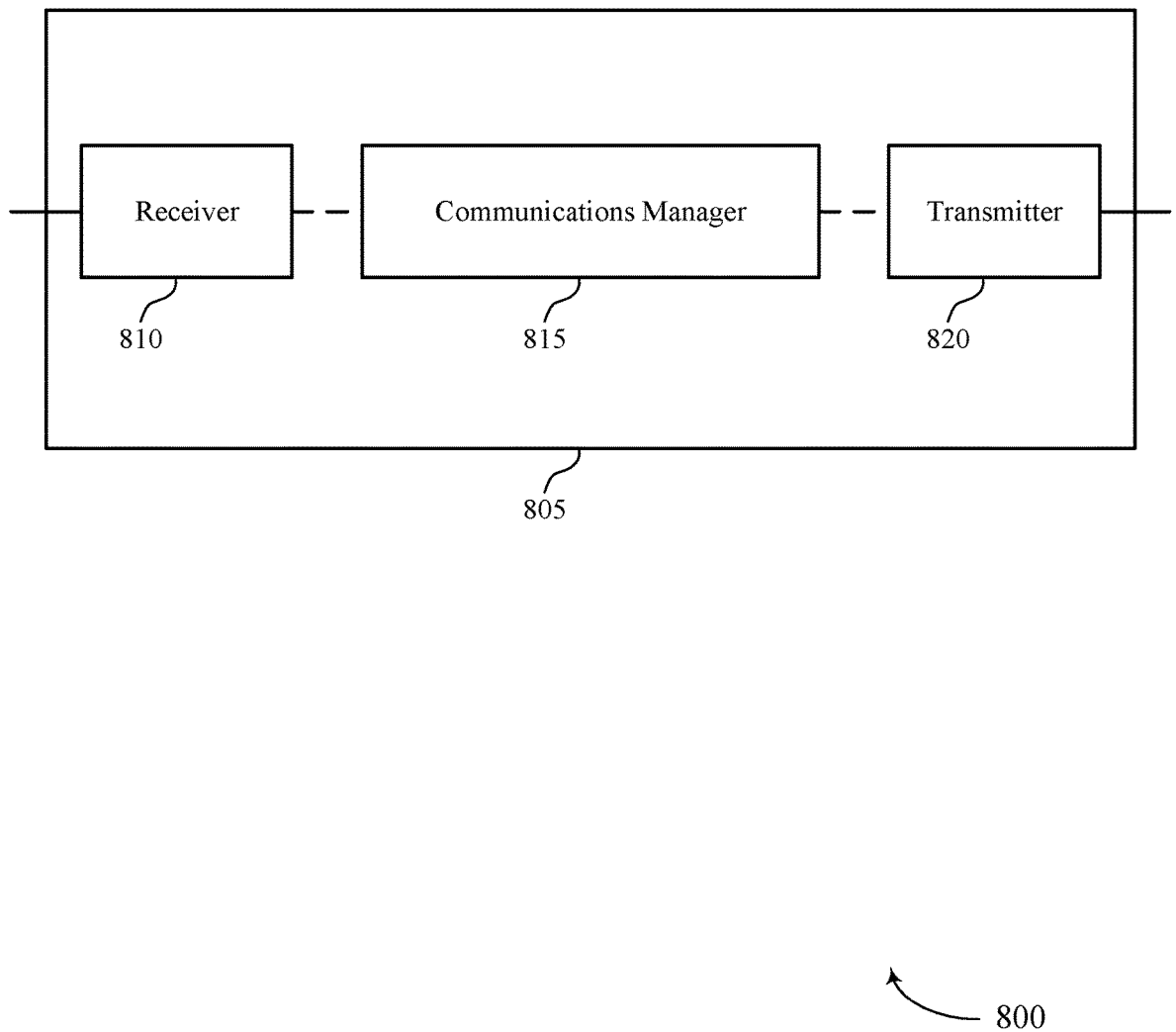
FIGS. 8 and 9 show block diagrams of devices that support CORESET and SS set configuration for full duplex operation in accordance with aspects of the present disclosure.

FIG. 8 shows a block diagram 800 of a device 805 that supports CORESET and SS set configuration for full duplex operation in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to CORESET and SS set configuration for full duplex operation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit an indication that a duplex mode is associated with a control resource set, a search space set, or both, identify a first search space set including one or more symbols of a first control resource set, where the indication pertains to at least one of the first search space set or the first control resource set, and transmit, in accordance with the duplex mode, downlink control information in the first control resource set according to the first search space set. The communications manager 815 may be an example of aspects of the communications manager 1110 described herein.

The actions performed by the communications manager 615 as described herein may be implemented to realize one or more potential advantages. One implementation may provide improved quality and reliability of service at the base station 105, as self-interference at the wireless device is reduced through duplex mode configuration for control information.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
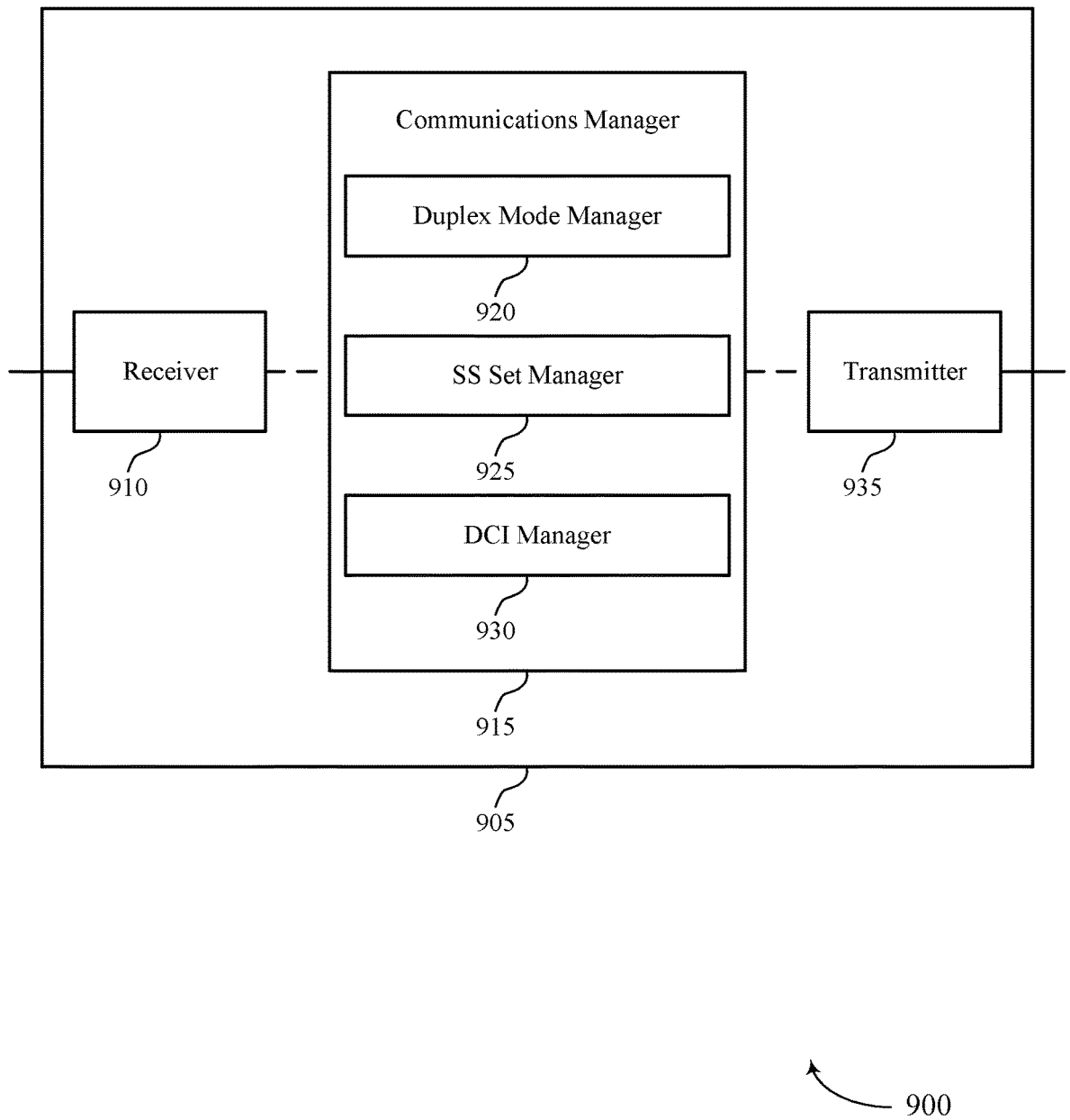

FIG. 9 shows a block diagram 900 of a device 905 that supports CORESET and SS set configuration for full duplex operation in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to CORESET and SS set configuration for full duplex operation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a duplex mode manager 920, a SS set manager 925, and a DCI manager 930. The communications manager 915 may be an example of aspects of the communications manager 1110 described herein.

The duplex mode manager 920 may transmit an indication that a duplex mode is associated with a control resource set, a search space set, or both. The SS set manager 925 may identify a first search space set including one or more symbols of a first control resource set, where the indication pertains to at least one of the first search space set or the first control resource set. The DCI manager 930 may transmit, in accordance with the duplex mode, downlink control information in the first control resource set according to the first search space set.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
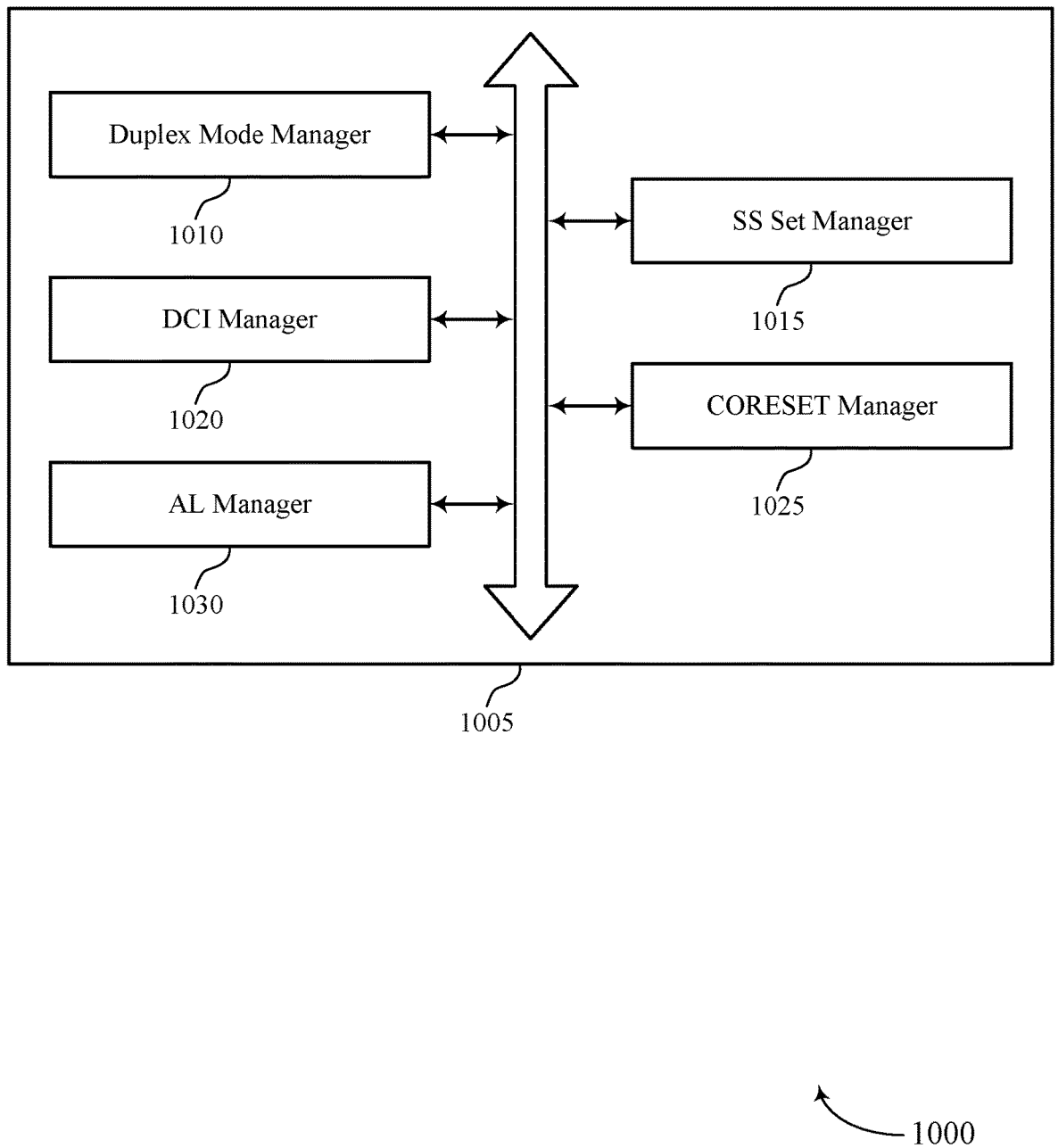
FIG. 10 shows a block diagram of a communications manager that supports CORESET and SS set configuration for full duplex operation in accordance with aspects of the present disclosure.

FIG. 10 shows a block diagram 1000 of a communications manager 1005 that supports CORESET and SS set configuration for full duplex operation in accordance with aspects of the present disclosure. The communications manager 1005 may be an example of aspects of a communications manager 815, a communications manager 915, or a communications manager 1110 described herein. The communications manager 1005 may include a duplex mode manager 1010, a SS set manager 1015, a DCI manager 1020, a CORESET manager 1025, and an AL manager 1030. Each of these modules may communicate, directly or indirectly, with one another (e.g., via one or more buses).

The duplex mode manager 1010 may transmit an indication that a duplex mode is associated with a control resource set, a search space set, or both. In some examples, the duplex mode manager 1010 may transmit a first indication of a first duplex mode for the first control resource set. In some examples, the duplex mode manager 1010 may transmit a second indication of a second duplex mode for the first search space set, where the first duplex mode and the second duplex mode are different. In some examples, the duplex mode manager 1010 may determine the first duplex mode overrides the second duplex mode, where the downlink control information is transmitted based on the first duplex mode. In some examples, the duplex mode manager 1010 may determine the second duplex mode overrides the first duplex mode, where the downlink control information is transmitted based on the second duplex mode.

In some cases, the second duplex mode for the first search space set overrides the first duplex mode for the first control resource set, and the downlink control information is transmitted based on the second duplex mode. In some cases, the first duplex mode for the first control resource set overrides the second duplex mode for the first search space set, and the downlink control information is transmitted based on the first duplex mode.

In some cases, the duplex mode includes a full duplex mode in which the UE is capable of simultaneously receiving the downlink control information from a first serving base station and transmitting to a second serving base station using a same time-frequency resource. In some cases, the duplex mode includes a half duplex mode in which the UE is capable receiving the downlink control information from a first serving base station and transmitting to a second serving base station using different time-frequency resources or different time resources. In some cases, the duplex mode includes a hybrid duplex mode in which the UE is capable of either simultaneously receiving the downlink control information from a first serving base station and transmitting to a second serving base station using a same time-frequency resource, or in which the UE is capable of receiving the downlink control information from the first serving base station and transmitting to the second serving base station using different time-frequency resource.

The SS set manager 1015 may identify a first search space set including one or more symbols of a first control resource set, where the indication pertains to at least one of the first search space set or the first control resource set. In some examples, transmitting a second configuration for the first search space set, where the second configuration includes the indication. In some examples, the SS set manager 1015 may determine a search space set identification associated with the first search space set based on the transmitted second configuration, where the indication is associated with the search space set identification within the first control resource set. In some examples, the SS set manager 1015 may identify a search space set type based on the first search space set, where the indication is associated with the search space set type.

In some examples, the SS set manager 1015 may schedule a physical downlink control channel, where the search space set type is identified based on information scheduled by the physical downlink control channel transmitted within the first search space set. In some cases, the indication is associated with the search space set type across a set of control resource sets. In some cases, the indication is associated with the search space set type within the first control resource set.

The DCI manager 1020 may transmit, in accordance with the duplex mode, downlink control information in the first control resource set according to the first search space set. The CORESET manager 1025 may transmit a configuration for the first control resource set, where the configuration includes the indication. The AL manager 1030 may identify an aggregation level corresponding to the first control resource set, where the indication is associated with the aggregation level.

Figure 11:
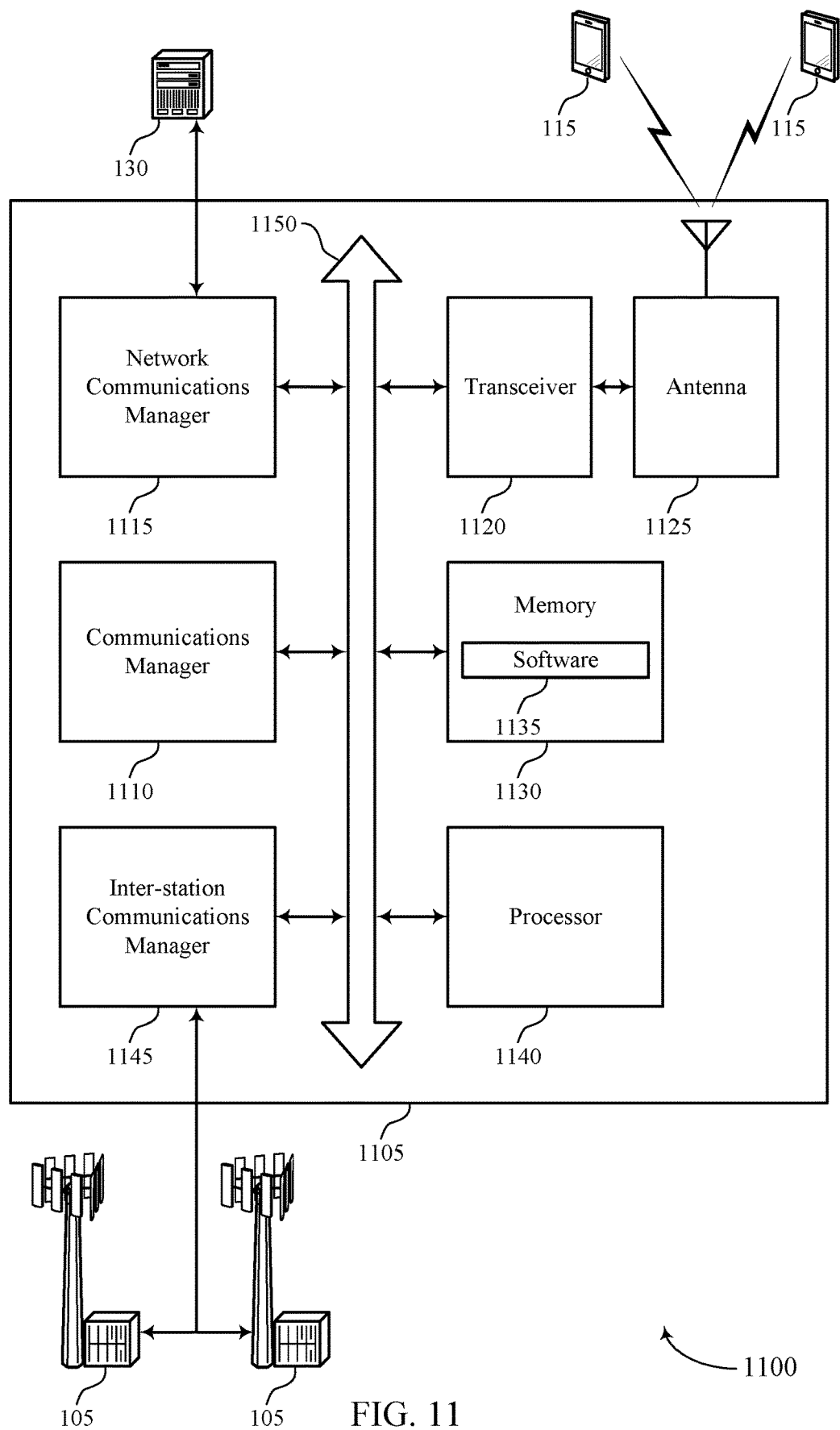
FIG. 11 shows a diagram of a system including a device that supports CORESET and SS set configuration for full duplex operation in accordance with aspects of the present disclosure.

FIG. 11 shows a diagram of a system 1100 including a device 1105 that supports CORESET and SS set configuration for full duplex operation in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit an indication that a duplex mode is associated with a control resource set, a search space set, or both, identify a first search space set including one or more symbols of a first control resource set, where the indication pertains to at least one of the first search space set or the first control resource set, and transmit, in accordance with the duplex mode, downlink control information in the first control resource set according to the first search space set.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code or software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting CORESET and SS set configuration for full duplex operation).

Based on resolving conflicting duplex modes based on a priority of the configured duplex modes, a duplex mode may be configured to improve spectrum efficiency, mitigate self-interference, increase system throughput, etc. As such, when a duplex mode is chosen, the processor 1140 may be ready to respond more efficiently through the reduction of a ramp up in processing power.

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
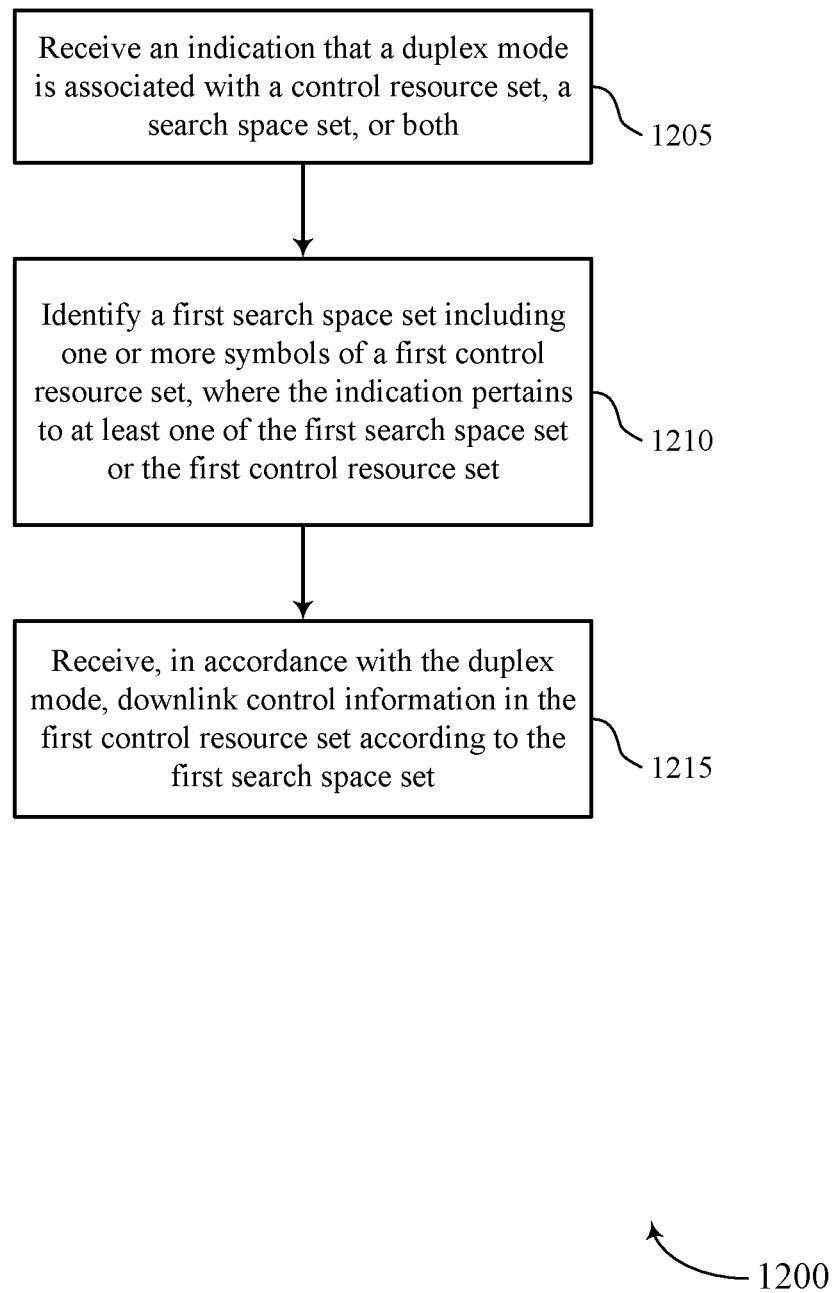
FIGS. 12 through 16 show flowcharts illustrating methods that support CORESET and SS set configuration for full duplex operation in accordance with aspects of the present disclosure.

FIG. 12 shows a flowchart illustrating a method 1200 that supports CORESET and SS set configuration for full duplex operation in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive an indication that a duplex mode is associated with a control resource set, a search space set, or both. The operations of 1205 may be performed according to the methods described herein. In some examples, aspects of the operations of 1205 may be performed by a duplex mode manager as described with reference to FIGS. 4 through 7.

At 1210, the UE may identify a first search space set including one or more symbols of a first control resource set, where the indication pertains to at least one of the first search space set or the first control resource set. The operations of 1210 may be performed according to the methods described herein. In some examples, aspects of the operations of 1210 may be performed by a SS set manager as described with reference to FIGS. 4 through 7.

At 1215, the UE may receive, in accordance with the duplex mode, downlink control information in the first control resource set according to the first search space set. The operations of 1215 may be performed according to the methods described herein. In some examples, aspects of the operations of 1215 may be performed by a DCI manager as described with reference to FIGS. 4 through 7.

Figure 13:
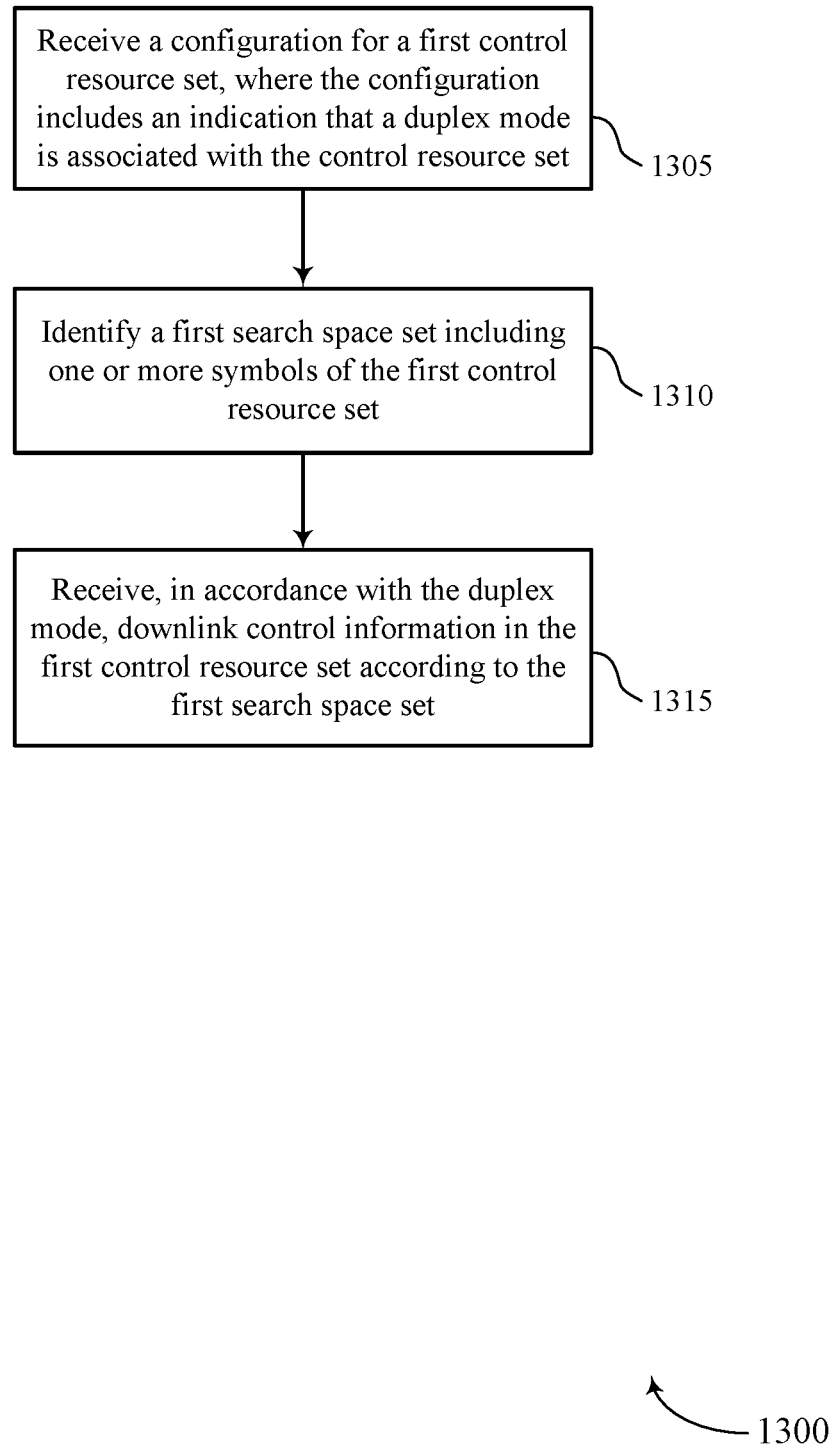

FIG. 13 shows a flowchart illustrating a method 1300 that supports CORESET and SS set configuration for full duplex operation in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a configuration for a first control resource set, where the configuration includes an indication that a duplex mode is associated with the control resource set. The operations of 1305 may be performed according to the methods described herein. In some examples, aspects of the operations of 1305 may be performed by a CORESET manager as described with reference to FIGS. 4 through 7.

At 1310, the UE may identify a first search space set including one or more symbols of the first control resource set. The operations of 1310 may be performed according to the methods described herein. In some examples, aspects of the operations of 1310 may be performed by a SS set manager as described with reference to FIGS. 4 through 7.

At 1315, the UE may receive, in accordance with the duplex mode, downlink control information in the first control resource set according to the first search space set. The operations of 1315 may be performed according to the methods described herein. In some examples, aspects of the operations of 1315 may be performed by a DCI manager as described with reference to FIGS. 4 through 7.

Figure 14:
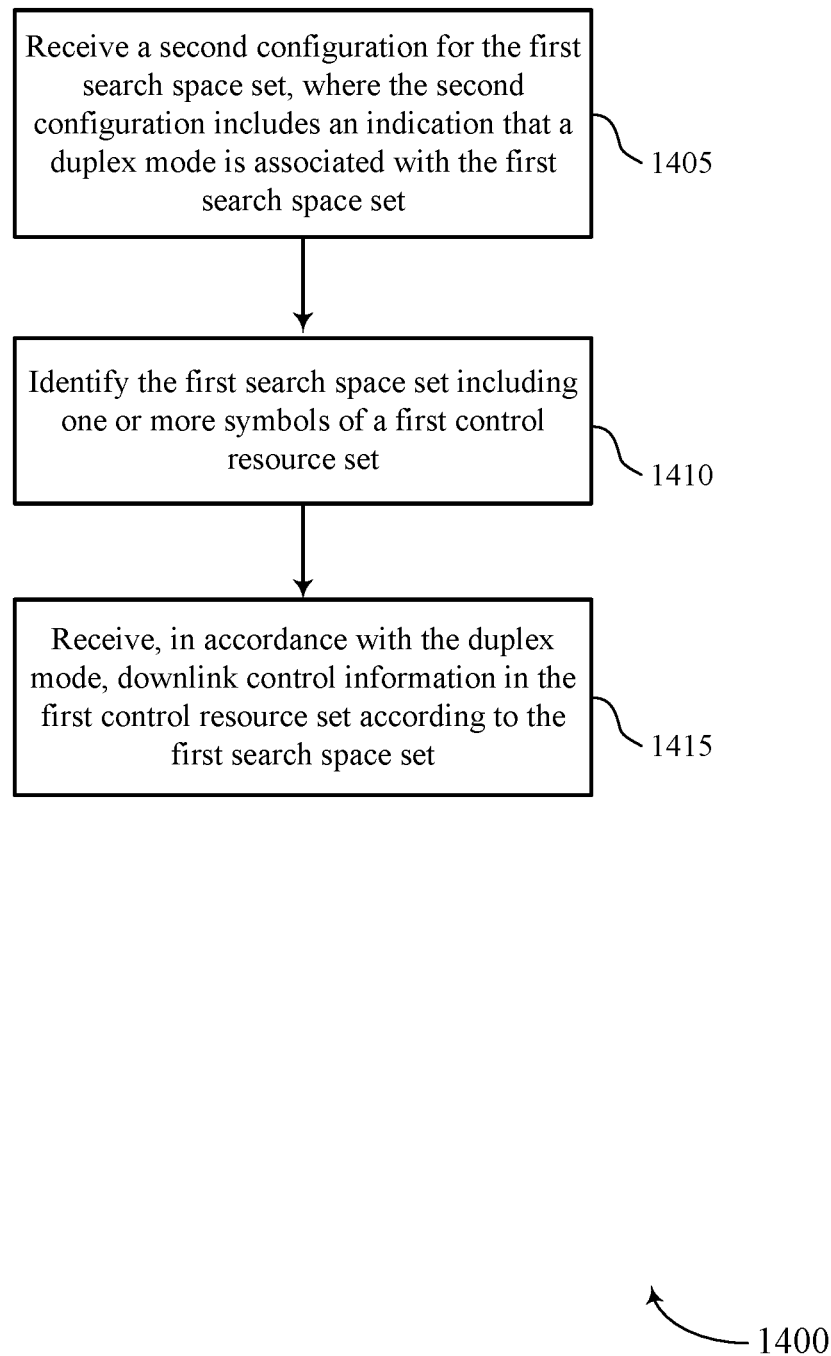

FIG. 14 shows a flowchart illustrating a method 1400 that supports CORESET and SS set configuration for full duplex operation in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive a second configuration for a first search space set, where the second configuration includes an indication that a duplex mode is associated with the first search space set. The operations of 1405 may be performed according to the methods described herein. In some examples, aspects of the operations of 1405 may be performed by a SS set manager as described with reference to FIGS. 4 through 7.

At 1410, the UE may identify the first search space set including one or more symbols of a first control resource set. The operations of 1410 may be performed according to the methods described herein. In some examples, aspects of the operations of 1410 may be performed by a SS set manager as described with reference to FIGS. 4 through 7.

At 1415, the UE may receive, in accordance with the duplex mode, downlink control information in the first control resource set according to the first search space set. The operations of 1415 may be performed according to the methods described herein. In some examples, aspects of the operations of 1415 may be performed by a DCI manager as described with reference to FIGS. 4 through 7.

Figure 15:
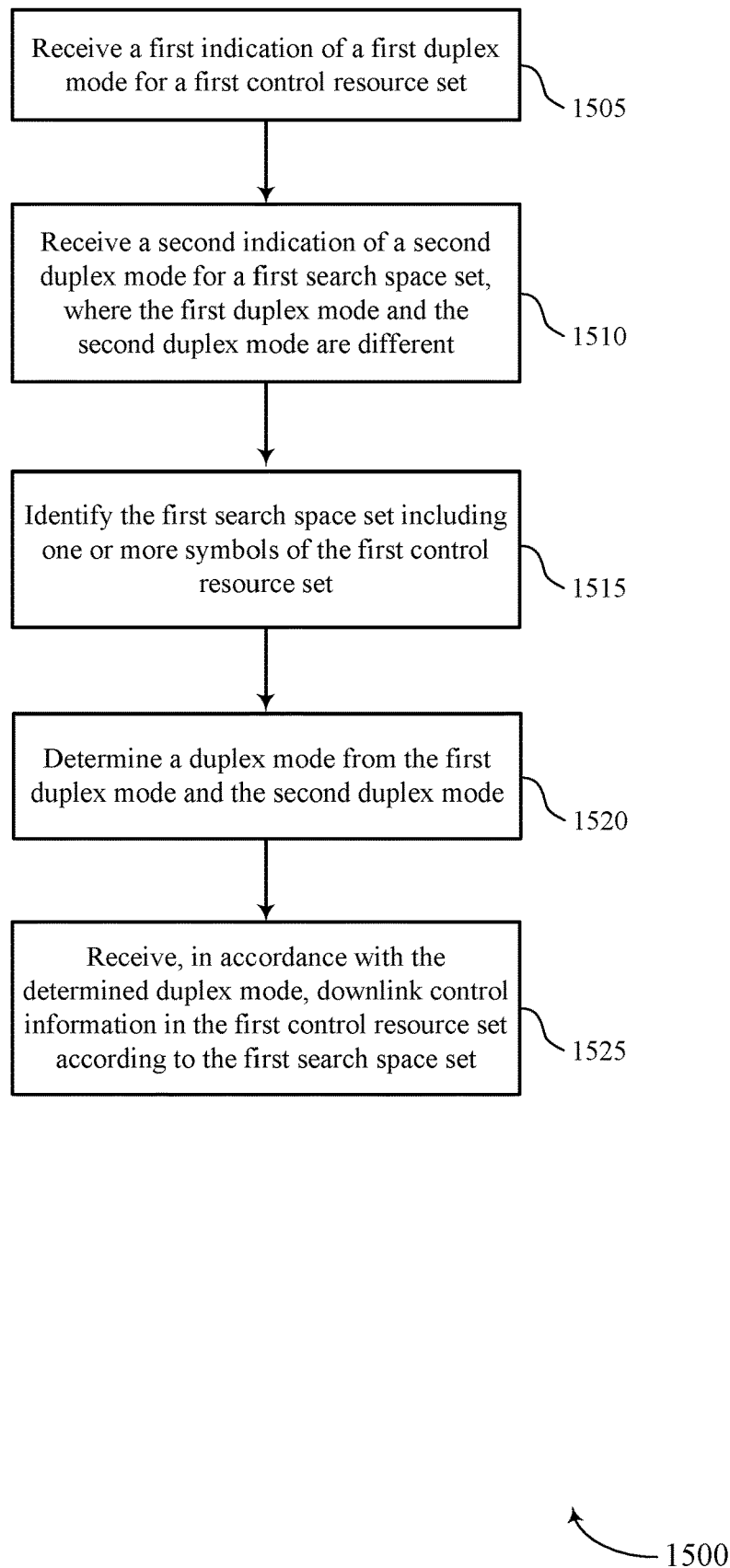

FIG. 15 shows a flowchart illustrating a method 1500 that supports CORESET and SS set configuration for full duplex operation in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive a first indication of a first duplex mode for the first control resource set. The operations of 1505 may be performed according to the methods described herein. In some examples, aspects of the operations of 1505 may be performed by a duplex mode manager as described with reference to FIGS. 4 through 7.

At 1510, the UE may receive a second indication of a second duplex mode for the first search space set, where the first duplex mode and the second duplex mode are different. The operations of 1510 may be performed according to the methods described herein. In some examples, aspects of the operations of 1510 may be performed by a duplex mode manager as described with reference to FIGS. 4 through 7.

At 1515, the UE may identify a first search space set including one or more symbols of a first control resource set, where the indication pertains to at least one of the first search space set or the first control resource set. The operations of 1515 may be performed according to the methods described herein. In some examples, aspects of the operations of 1515 may be performed by a SS set manager as described with reference to FIGS. 4 through 7.

At 1520, the UE may determine a duplex mode from the first duplex mode and the second duplex mode. For example, in some cases the first duplex mode or the second duplex mode may be associated with a higher priority than the other (e.g., and the UE may determine to employ the higher priority duplex mode). In some examples, the duplex mode associated with the CORESET configuration (e.g., the first duplex mode) may override the duplex mode associated with the SS set configuration (e.g., the UE may determine the duplex mode to be the first duplex mode, based on the first duplex mode overriding the second duplex mode). In some examples, the duplex mode associated with the SS set configuration (e.g., the second duplex mode) may override the duplex mode associated with the CORESET configuration (e.g., the UE may determine the duplex mode to be the second duplex mode, based on the second duplex mode overriding the first duplex mode). The operations of 1520 may be performed according to the methods described herein. In some examples, aspects of the operations of 1520 may be performed by a duplex mode manager as described with reference to FIGS. 4 through 7.

At 1525, the UE may receive, in accordance with the determined duplex mode, downlink control information in the first control resource set according to the first search space set. The operations of 1525 may be performed according to the methods described herein. In some examples, aspects of the operations of 1525 may be performed by a DCI manager as described with reference to FIGS. 4 through 7.

Figure 16:
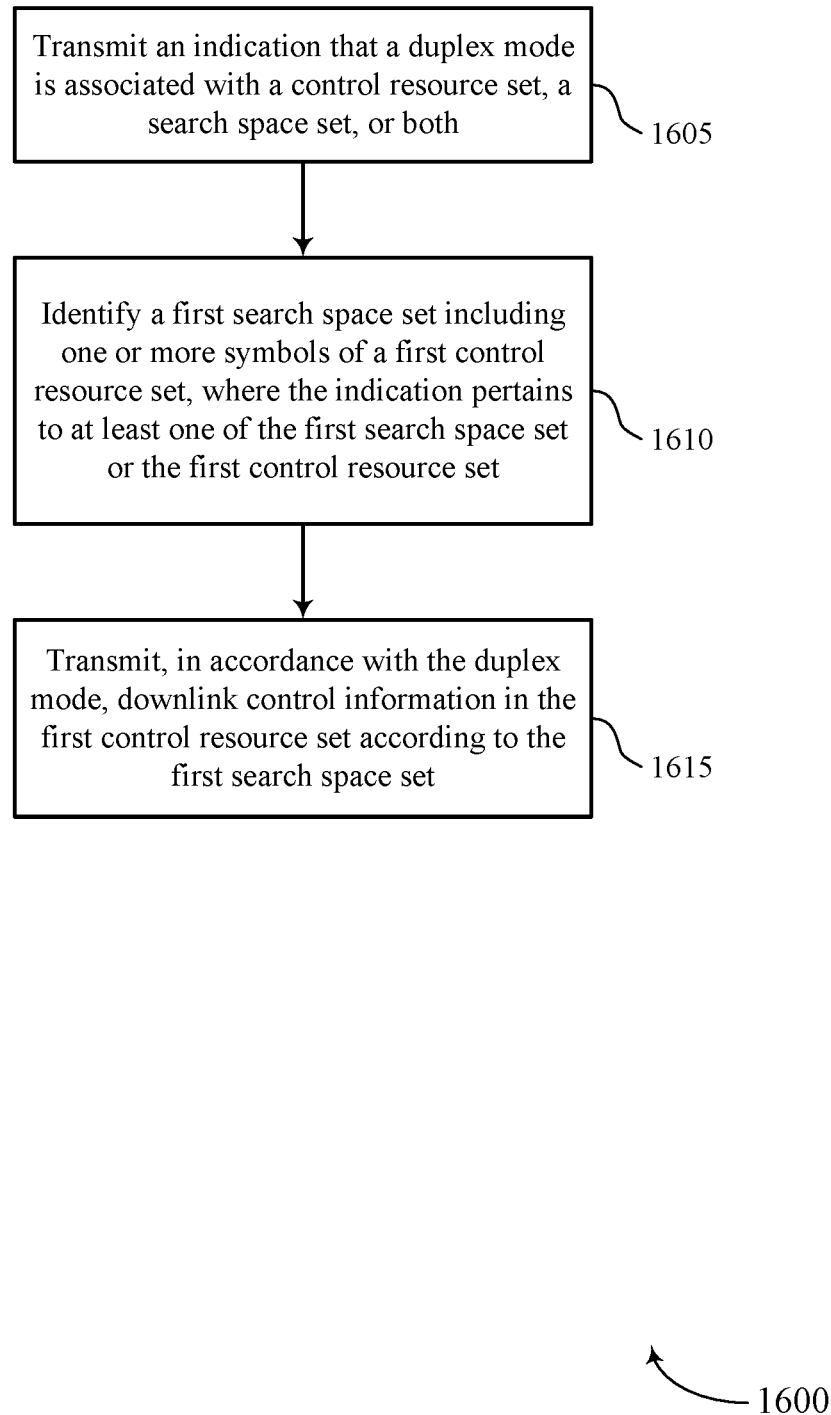

FIG. 16 shows a flowchart illustrating a method 1600 that supports CORESET and SS set configuration for full duplex operation in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit an indication that a duplex mode is associated with a control resource set, a search space set, or both. The operations of 1605 may be performed according to the methods described herein. In some examples, aspects of the operations of 1605 may be performed by a duplex mode manager as described with reference to FIGS. 8 through 11.

At 1610, the base station may identify a first search space set including one or more symbols of a first control resource set, where the indication pertains to at least one of the first search space set or the first control resource set. The operations of 1610 may be performed according to the methods described herein. In some examples, aspects of the operations of 1610 may be performed by a SS set manager as described with reference to FIGS. 8 through 11.

At 1615, the base station may transmit, in accordance with the duplex mode, downlink control information in the first control resource set according to the first search space set. The operations of 1615 may be performed according to the methods described herein. In some examples, aspects of the operations of 1615 may be performed by a DCI manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Example 1

A method for wireless communication at a user equipment (UE), comprising: receiving an indication that a duplex mode is associated with a control resource set, a search space set, or both; identifying a first search space set comprising one or more symbols of a first control resource set, wherein the indication pertains to at least one of the first search space set or the first control resource set; and receiving, in accordance with the duplex mode, downlink control information in the first control resource set according to the first search space set.

Example 2

The method of example 1, wherein receiving the indication comprises: receiving a configuration for the first control resource set, wherein the configuration comprises the indication.

Example 3

The method of any of examples 1 or 2, wherein receiving the indication comprises: receiving a second configuration for the first search space set, wherein the second configuration comprises the indication.

Example 4

The method of any of examples 1 to 3, wherein receiving the indication comprises: determining a search space set identification associated with the first search space set based at least in part on the received second configuration, wherein the indication is associated with the first search space set identification within the first control resource set.

Example 5

The method of any of examples 1 to 4, further comprising: identifying a search space set type based at least in part on the first search space set, wherein the indication is associated with the search space set type.

Example 6

The method of any of examples 1 to 5, wherein the search space set type is identified based at least in part on information scheduled by a physical downlink control channel transmitted within the first search space set.

Example 7

The method of any of examples 1 to 5, wherein the indication is associated with the search space set type across a plurality of control resource sets.

Example 8

The method of any of examples 1 to 5, wherein the indication is associated with the search space set type within the first control resource set.

Example 9

The method of any of examples 1 to 8, wherein the duplex mode comprises a full duplex mode in which the UE is capable of simultaneously receiving the downlink control information from a first serving base station and transmitting to a second serving base station using a same time-frequency resource.

Example 10

The method of any of examples 1 to 9, wherein the first serving base station and the second serving base station comprise a same serving base station.

Example 11

The method of any of examples 1 to 10, wherein the duplex mode comprises a half duplex mode in which the UE is capable receiving the downlink control information from a first serving base station and transmitting to a second serving base station using different time-frequency resources or different time resources.

Example 12

The method of any of examples 1 to 11, wherein the duplex mode comprises a hybrid duplex mode in which the UE is capable of either simultaneously receiving the downlink control information from a first serving base station and transmitting to a second serving base station using a same time-frequency resource, or in which the UE is capable of receiving the downlink control information from the first serving base station and transmitting to the second serving base station using different time-frequency resource.

Example 13

The method of any of examples 1 to 12, wherein receiving the indication comprises: receiving a first indication of a first duplex mode for the first control resource set; and receiving a second indication of a second duplex mode for the first search space set, wherein the first duplex mode and the second duplex mode are different.

Example 14

The method of any of examples 1 to 13, wherein the second duplex mode for the first search space set overrides the first duplex mode for the first control resource set, and the downlink control information is received based at least in part on the second duplex mode.

Example 15

The method of any of examples 1 to 13, wherein the first duplex mode for the first control resource set overrides the second duplex mode for the first search space set, and the downlink control information is received based at least in part on the first duplex mode.

Example 16

The method of any of examples 1 to 13, further comprising: determining the first duplex mode overrides the second duplex mode, wherein the downlink control information is received based at least in part on the first duplex mode.

Example 17

The method of any of examples 1 to 13, further comprising: determining the second duplex mode overrides the first duplex mode, wherein the downlink control information is received based at least in part on the second duplex mode.

Example 18

The method of any of examples 1 to 17, further comprising: identifying an aggregation level corresponding to the first control resource set, wherein the indication is associated with the aggregation level.

Example 19

An apparatus for wireless communications comprising a processor; memory coupled with the processor; and instructions stored in the memory and executable by the processor to cause the apparatus to perform a method of any of examples 1 to 18.

Example 20

A non-transitory computer-readable medium storing code for wireless communications, the code comprising instructions executable by a processor to perform a method of any of examples 1 to 18.

Example 21

An apparatus, comprising means for performing the method of any of examples 1 to 18.

Example 22

A method for wireless communication at a base station, comprising: transmitting an indication that a duplex mode is associated with a control resource set, a search space set, or both; identifying a first search space set comprising one or more symbols of a first control resource set, wherein the indication pertains to at least one of the first search space set or the first control resource set; and transmitting, in accordance with the duplex mode, downlink control information in the first control resource set according to the first search space set.

Example 23

The method of example 22, wherein transmitting the indication comprises: transmitting a configuration for the first control resource set, wherein the configuration comprises the indication.

Example 24

The method of any of examples 22 to 23, wherein transmitting the indication comprises: transmitting a second configuration for the first search space set, wherein the second configuration comprises the indication.

Example 25

The method of any of examples 22 to 24, further comprising: determining a search space set identification associated with the first search space set based at least in part on the transmitted second configuration, wherein the indication is associated with the search space set identification within the first control resource set.

Example 26

The method of any of examples 22 to 25, further comprising: identifying a search space set type based at least in part on the first search space set, wherein the indication is associated with the search space set type.

Example 27

The method of any of examples 22 to 26, further comprising: scheduling a physical downlink control channel, wherein the search space set type is identified based at least in part on information scheduled by the physical downlink control channel transmitted within the first search space set.

Example 28

The method of any of examples 22 to 26, wherein the indication is associated with the search space set type across a plurality of control resource sets.

Example 29

The method of any of examples 22 to 26, wherein the indication is associated with the search space set type within the first control resource set.

Example 30

The method of any of examples 22 to 29, wherein the duplex mode comprises a full duplex mode in which the UE is capable of simultaneously receiving the downlink control information from a first serving base station and transmitting to a second serving base station using a same time-frequency resource.

Example 31

The method of any of examples 22 to 30, wherein the duplex mode comprises a half duplex mode in which the UE is capable receiving the downlink control information from a first serving base station and transmitting to a second serving base station using different time-frequency resources or different time resources.

Example 32

The method of any of examples 22 to 31, wherein the duplex mode comprises a hybrid duplex mode in which the UE is capable of either simultaneously receiving the downlink control information from a first serving base station and transmitting to a second serving base station using a same time-frequency resource, or in which the UE is capable of receiving the downlink control information from the first serving base station and transmitting to the second serving base station using different time-frequency resource.

Example 33

The method of any of examples 22 to 32, identifying an aggregation level corresponding to the first control resource set, wherein the indication is associated with the aggregation level.

Example 34

The method of any of examples 22 to 33, wherein transmitting the indication comprises: transmitting a first indication of a first duplex mode for the first control resource set; and transmitting a second indication of a second duplex mode for the first search space set, wherein the first duplex mode and the second duplex mode are different.

Example 35

The method of any of examples 22 to 34, wherein the second duplex mode for the first search space set overrides the first duplex mode for the first control resource set, and the downlink control information is transmitted based at least in part on the second duplex mode.

Example 36

The method of any of examples 22 to 34, wherein the first duplex mode for the first control resource set overrides the second duplex mode for the first search space set, and the downlink control information is transmitted based at least in part on the first duplex mode.

Example 37

The method of any of examples 22 to 34, further comprising: determining the first duplex mode overrides the second duplex mode, wherein the downlink control information is transmitted based at least in part on the first duplex mode.

Example 38

An apparatus for wireless communications comprising a processor; memory coupled with the processor; and instructions stored in the memory and executable by the processor to cause the apparatus to perform a method of any of examples 22 to 37.

Example 39

A non-transitory computer-readable medium storing code for wireless communications, the code comprising instructions executable by a processor to perform a method of any of examples 22 to 37.

Example 40

An apparatus, comprising means for performing the method of any of examples 22 to 37.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving an indication for a duplex mode configuration that is associated with a control resource set and a search space set, wherein the duplex mode configuration, the control resource set, and the search space set are each mapped to a priority of information, the information being conveyed via the control resource set and the search space set;

identifying a first search space set comprising one or more symbols of a first control resource set, wherein the indication pertains to the first search space set and the first control resource set; and receiving, in accordance with the duplex mode configuration, downlink control information in the first control resource set according to the first search space set.

2. The method of claim 1, wherein receiving the indication comprises:
receiving a configuration for the first control resource set, wherein the configuration comprises the indication.

3. The method of claim 1, wherein receiving the indication comprises:
receiving a second configuration for the first search space set, wherein the second configuration comprises the indication.

4. The method of claim 3, further comprising:
determining a search space set identification associated with the first search space set based at least in part on the received second configuration, wherein the indication is associated with the first search space set identification within the first control resource set.

5. The method of claim 1, further comprising:
identifying a search space set type based at least in part on the first search space set, wherein the indication is associated with the search space set type.

6. The method of claim 5, wherein the search space set type is identified based at least in part on information scheduled by a physical downlink control channel transmitted within the first search space set.

7. The method of claim 5, wherein the indication is associated with the search space set type across a plurality of control resource sets.

8. The method of claim 5, wherein the indication is associated with the search space set type within the first control resource set.

9. The method of claim 1, wherein the duplex mode comprises a full duplex mode in which the UE is capable of simultaneously receiving the downlink control information from a first serving network entity and transmitting to a second serving network entity using a same time-frequency resource.

10. The method of claim 9, wherein the first serving network entity and the second serving network entity comprise a same serving network entity.

11. The method of claim 1, wherein the duplex mode comprises a half duplex mode in which the UE is capable of receiving the downlink control information from a first serving network entity and transmitting to a second serving network entity using different time-frequency resources or different time resources.

12. The method of claim 1, wherein the duplex mode comprises a hybrid duplex mode in which the UE is capable of either simultaneously receiving the downlink control information from a first serving network entity and transmitting to a second serving network entity using a same time-frequency resource, or in which the UE is capable of receiving the downlink control information from the first serving network entity and transmitting to the second serving network entity using different time-frequency resource.

13. The method of claim 1, wherein receiving the indication comprises:
receiving a first indication of a first duplex mode for the first control resource set; and
receiving a second indication of a second duplex mode for the first search space set, wherein the first duplex mode and the second duplex mode are different.

14. The method of claim 13, wherein the second duplex mode for the first search space set overrides the first duplex mode for the first control resource set, and the downlink control information is received based at least in part on the second duplex mode.

15. The method of claim 13, wherein the first duplex mode for the first control resource set overrides the second duplex mode for the first search space set, and the downlink control information is received based at least in part on the first duplex mode.

16. The method of claim 13, further comprising:
determining the first duplex mode overrides the second duplex mode, wherein the downlink control information is received based at least in part on the first duplex mode.

17. The method of claim 13, further comprising:
determining the second duplex mode overrides the first duplex mode, wherein the downlink control information is received based at least in part on the second duplex mode.

18. The method of claim 1, further comprising:
identifying an aggregation level corresponding to the first control resource set, wherein the indication is associated with the aggregation level.

19. An apparatus for wireless communication at a user equipment (UE), comprising:
a processor,
memory coupled with the processor; and
instructions stored in the memory and executable by the processor to cause the apparatus to:
receive an indication for a duplex mode configuration that is associated with a control resource set and a search space set, wherein the duplex mode configuration, the control resource set, and the search space set are each mapped to a priority of information, the information being conveyed via the control resource set and the search space set;
identify a first search space set comprising one or more symbols of a first control resource set, wherein the indication pertains to the first search space set and the first control resource set; and
receive, in accordance with the duplex mode configuration, downlink control information in the first control resource set according to the first search space set.

20. The apparatus of claim 19, wherein the instructions to receive the indication are executable by the processor to cause the apparatus to:
receive a second configuration for the first search space set, wherein the second configuration comprises the indication; and
determine a search space set identification associated with the first search space set based at least in part on the received second configuration, wherein the indication is associated with the first search space set identification within the first control resource set.

21. The apparatus of claim 19, wherein the instructions are further executable by the processor to cause the apparatus to:
identify a search space set type based at least in part on the first search space set, wherein the indication is associated with the search space set type.

22. The apparatus of claim 21, wherein the search space set type is identified based at least in part on information scheduled by a physical downlink control channel transmitted within the first search space set.

23. The apparatus of claim 21, wherein the indication is associated with the search space set type across a plurality of control resource sets.

24. The apparatus of claim 21, wherein the indication is associated with the search space set type within the first control resource set.

25. The apparatus of claim 19, wherein the duplex mode comprises a full duplex mode in which the UE is capable of simultaneously receiving the downlink control information from a first serving network entity and transmitting to a second serving network entity using a same time-frequency resource, and wherein the first serving network entity and the second serving network entity comprise a same serving network entity.

26. The apparatus of claim 19, wherein the duplex mode comprises a half duplex mode in which the UE is capable of receiving the downlink control information from a first serving network entity and transmitting to a second serving network entity using different time-frequency resources or different time resources.

27. The apparatus of claim 19, wherein the duplex mode comprises a hybrid duplex mode in which the UE is capable of either simultaneously receiving the downlink control information from a first serving network entity and transmitting to a second serving network entity using a same time-frequency resource, or in which the UE is capable of receiving the downlink control information from the first serving network entity and transmitting to the second serving network entity using different time-frequency resource.

28. The apparatus of claim 19, wherein the instructions to receive the indication are executable by the processor to cause the apparatus to:
receive a first indication of a first duplex mode for the first control resource set; and
receive a second indication of a second duplex mode for the first search space set, wherein the first duplex mode and the second duplex mode are different.

29. An apparatus for wireless communication at a user equipment (UE), comprising:
means for receiving an indication for a duplex mode configuration that is associated with a control resource set and a search space set, wherein the duplex mode configuration, the control resource set, and the search space set are each mapped to a priority of information, the information being conveyed via the control resource set and the search space set;
means for identifying a first search space set comprising one or more symbols of a first control resource set, wherein the indication pertains to the first search space set and the first control resource set; and
means for receiving, in accordance with the duplex mode configuration, downlink control information in the first control resource set according to the first search space set.

30. A non-transitory computer-readable medium storing code for wireless communication at a user equipment (UE), the code comprising instructions executable by a processor to:
receive an indication for a duplex mode configuration that is associated with a control resource set and a search space set, wherein the duplex mode configuration, the control resource set, and the search space set are each mapped to a priority of information, the information being conveyed via the control resource set and the search space set;
identify a first search space set comprising one or more symbols of a first control resource set, wherein the indication pertains to the first search space set and the first control resource set; and
receive, in accordance with the duplex mode configuration, downlink control information in the first control resource set according to the first search space set.

* * * * *